(12) United States Patent
Murata et al.

(10) Patent No.: US 7,586,673 B2
(45) Date of Patent: Sep. 8, 2009

(54) OPTICAL GAIN WAVEGUIDE AND METHOD OF CONTROLLING THE SAME

(75) Inventors: Takahiro Murata, Fukuoka (JP); Motoki Kakui, Yokohama (JP); Tetsuya Haruna, Yokohama (JP)

(73) Assignees: Sumitomo Electric Industries, Ltd., Osaka (JP); Kyushu University, National University Corporation, Fukuoka (JP)

( * ) Notice: Subject to any disclaimer, the term of this patent is extended or adjusted under 35 U.S.C. 154(b) by 0 days.

(21) Appl. No.: 11/365,810

(22) Filed: Mar. 2, 2006

(65) Prior Publication Data

US 2006/0215254 A1   Sep. 28, 2006

(30) Foreign Application Priority Data

Mar. 2, 2005   (JP) ............................ P2005-058109

(51) Int. Cl.
*H01S 3/00* (2006.01)
(52) U.S. Cl. .................................. 359/337.1; 359/341.3
(58) Field of Classification Search .............. 359/337.1, 359/341.3
See application file for complete search history.

(56) References Cited

U.S. PATENT DOCUMENTS

| | | | | |
|---|---|---|---|---|
| 5,706,124 A * | 1/1998 | Imoto et al. | ............... | 359/337.1 |
| 5,920,423 A * | 7/1999 | Grubb et al. | ........... | 359/341.33 |
| 6,563,628 B2 * | 5/2003 | Kitabayashi et al. | ..... | 359/337.1 |
| 6,621,624 B2 * | 9/2003 | Chu et al. | ................ | 359/341.1 |
| 7,116,472 B2 * | 10/2006 | Andrejco et al. | ......... | 359/341.5 |
| 2004/0052495 A1 * | 3/2004 | Englund et al. | ............. | 385/141 |
| 2005/0105866 A1 * | 5/2005 | Grudinin et al. | ............ | 385/123 |

OTHER PUBLICATIONS

A.J.G. Ellison, et al., "Hybrid Erbium Silicate Conventional-Band Fiber Amplifier with Ultra-Low Gain Ripple," Optical Amplifiers and Their Applications Topical Meeting, Postdeadline Papers, Jun. 11, 1999, PD2~1-2~4.

K.W. Bennett, et al., "980 nm band pump wavelength tuning of the gain spectrum of EDFA's," Optical Amplifiers and Their Applications, Technical Digest, Jul. 21-23, 1997, PD 4-1~PD 4~4.

(Continued)

*Primary Examiner*—Mark Hellner
(74) *Attorney, Agent, or Firm*—McDermott Will & Emery LLP

(57) ABSTRACT

The present invention relates to an optical gain waveguide having excellent gain flatness in C-band, and excellent tolerance against variations of a pumping light wavelength as well, and a method of controlling the same. The optical gain waveguide includes an optical waveguide region which is doped with Er element which can be pumped by irradiating pumping light with a wavelength of 976 nm or less, or a wavelength of 981 nm or more. A population inversion of Er is optimized so that a gain variation in the C-band becomes minimum, by the irradiation of the pumping light. At this time, a relative gain variation of the optical gain waveguide, which is defined by a peak gain value and a minimum gain value in the wavelength region of 1,530 nm to 1,560 nm becomes smaller than 11.5%. In addition, in the optical gain waveguide, a width of wavelength range producing the relative gain variation smaller than 11% is 36 nm or more.

22 Claims, 26 Drawing Sheets

| SAMPLE NO. | B OR F (wt%) | Ge (wt%) | Al (wt%) | Er-CONCENTRATION (wt·ppm) | PEAK WAVELENGTH (nm) | α 1.53 (dB/m) | MFD (μm) | CUTOFF WAVELENGTH (μm) | FUSION-SPLICING LOSS 1 (dB) | FUSION-SPLICING LOSS 2 (dB) |
|---|---|---|---|---|---|---|---|---|---|---|
| a | 0.0 | 5.2 | 4.9 | 500 | 1528.8 | 9.9 | 5.6 | 0.91 | 0.15 | 0.10 |
| b | 0.7 | 0.0 | 6.6 | 709 | 1527.6 | 12.5 | 6.7 | 1.45 | 0.06 | 0.23 |
| c | 1.9 | 0.0 | 3.0 | 800 | 1526.6 | 13.9 | 10.6 | 1.70 | 0.16 | |
| d | 0.3 | 0.0 | 6.8 | 808 | 1528.1 | 14.7 | 6.6 | 1.25 | 0.14 | 0.36 |
| e | 0.7 | 0.0 | 4.9 | 3000 | 1530.2 | 81.7 | 8.7 | 1.03 | 0.13 | 0.64 |

OTHER PUBLICATIONS

S. Shen, et al, "The influence of F$^-$-ion doping on the fluorescence ($^4I_{13/2} \rightarrow {}^4I_{15/2}$) line shape broadening in Er$^{3+}$-doped oxyfluoride silicate glasses," Optical Materials, 2004, pp. 321-333, vol. 25.

Conference on Optical Fiber Communications, Technical Digest, 1997, pp. 127-129, vol. 6.

Xian-geng Meng, et al., "Infrared broadband emission of bismuth-doped barium-aluminum-borate glasses," Optics Express, Mar. 7, 2005, pp. 1635-1642, vol. 13, No. 5.

Xian-geng Meng, et al., "Near infrared broadband emission of bismuth-doped aluminophosphate glass," Optics Express, Mar. 7, 2005, vol. 13, No. 5.

* cited by examiner

Fig.2

| SAMPLE NO. | B OR F (wt%) | Ge (wt%) | Al (wt%) | Er-CONCENTRATION (wt·ppm) | PEAK WAVELENGTH (nm) | α1.53 (dB/m) | MFD (μm) | CUTOFF WAVELENGTH (μm) | FUSION-SPLICING LOSS 1 (dB) | FUSION-SPLICING LOSS 2 (dB) |
|---|---|---|---|---|---|---|---|---|---|---|
| a | 0.0 | 5.2 | 4.9 | 500 | 1528.8 | 9.9 | 5.6 | 0.91 | 0.15 | 0.10 |
| b | 0.7 | 0.0 | 6.6 | 709 | 1527.6 | 12.5 | 6.7 | 1.45 | 0.06 | 0.23 |
| c | 1.9 | 0.0 | 3.0 | 800 | 1526.6 | 13.9 | 10.6 | 1.70 | 0.16 | |
| d | 0.3 | 0.0 | 6.8 | 808 | 1528.1 | 14.7 | 6.6 | 1.25 | 0.14 | 0.36 |
| e | 0.7 | 0.0 | 4.9 | 3000 | 1530.2 | 81.7 | 8.7 | 1.03 | 0.13 | 0.64 |

Fig.18

| SAMPLE TYPE | RELATIVE GAIN VARIATION 1 | RELATIVE GAIN VARIATION 2 |
|---|---|---|
| a | 11.9 | 37.1 |
| b | 10.1 | 23.7 |
| b+a | 10.2 | 23.5 |
| d | 10.8 | 26.5 |
| d+a | 10.8 | 26.6 |
| e | 9.6 | 30.9 |

Fig.23

| SAMPLE | RELATIVE GAIN VARIATION 1 (%) | EFFECTIVE BAND (nm) | RELATIVE GAIN VARIATION PER UNIT WAVELENGTH BAND (%/nm) | RELATIVE GAIN VARIATION WHEN SETTING MINIMUM WAVELENGTH OF BAND AT 1524.5 nm (%) |
|---|---|---|---|---|
| a | 12.9% | 37.3 | 0.34 | 46.0% |
| b | 11.3% | 38.0 | 0.30 | 31.8% |
| d | 12.0% | 37.9 | 0.32 | 36.4% |
| e | 11.0% | 36.8 | 0.30 | 42.9% |

OPTICAL GAIN WAVEGUIDE AND METHOD OF CONTROLLING THE SAME

BACKGROUND OF THE INVENTION

1. Field of the Invention

The present invention relates to an optical gain waveguide doped with Er element, and a method of controlling the same.

2. Related Background Art

An optical gain waveguide, whose optical waveguide region is doped with Er element, is, for example, an optical waveguide such as an optical fiber. In the optical waveguide, pumping light with a wavelength capable of pumping the Er element is propagated, as well as C-band signal light to be amplified. In general, as pumping light for pumping the Er element, pumping light with the 0.98-µm wavelength band is used (for example, refer to Documents 1 and 2). Further, in a WDM (wavelength division multiplexing) optical transmission system, the gain spectrum of the above optical gain waveguide has desirably excellent gain flatness in a wider wavelength band (that is, small gain variations in a wider wavelength band of the signal light), when taking into consideration the cases of collectively amplifying signal light of a plurality of channels mutually having different wavelengths.

Document 1: U.S. Pat. No. 6,621,624

Document 2: A. J. G. Ellison, et al., "Hybrid Erbium Silicate Conventional-Band Fiber Amplifier with Ultra-Low Gain Ripple", OAA1999, Postdeadline papers 2 (1999)

Document 3: K. W. Bennett, et al., OAA1997, Postdeadline papers 4 (1997)

Document 4: S. Shen and A. Jha, Optical Materials, vol. 25, pp. 321-333 (2004)

SUMMARY OF THE INVENTION

The inventors have studied the aforementioned prior art in detail, and as a result, have found problems as follows.

Namely, in an EDF, it is known that the gain spectral shape at a wavelength band of 1.53 µm greatly varies due to a minute difference in the pumping light with a wavelength band of 0.98 µm (a minute difference of wavelength). However, in the above Documents 1 and 2, there has been no consideration or reference in regard to the relationship between the pumping light wavelength and the gain spectrum and the gain flatness.

Furthermore, it is not desirable that the gain spectrum shape depends on the pumping light wavelength from the viewpoint of manufacturing variation of a light source emitting pumping light (generally, the light source includes a laser diode and a fiber grating for wavelength stabilization), and also from the viewpoint of characteristic variation in the laser diode and the fiber grating for wavelength stabilization while being in operation.

The present invention has been made to solve the above-mentioned issues. It is an object of the present invention to provide an optical gain waveguide having excellent gain flatness in C-band (1,530 nm to 1,565 nm) as well as an excellent tolerance against the variation of a pumping light wavelength, a method of controlling the optical gain waveguide, and an optical amplifier including the optical gain waveguide An optical gain waveguide according to the present invention is an optical transmission medium including an optical waveguide region, and the optical waveguide region is doped with Er element that can be pumped by irradiating: pumping light with a wavelength of 976 nm or less, or a wavelength of 981 nm or more; pumping light with an optimal wavelength at the 0.98-µm wavelength band; or pumping light at the 1.48-µm wavelength band. Furthermore, in a method of controlling optical amplification according to the present invention, an optical gain waveguide having the structure such as described above (i.e. an optical gain waveguide according to the present invention) is prepared. The pumping light is irradiated to the optical waveguide region so that a gain variation of the optical gain waveguide in C-band is minimized (two peaks in the C-band gain spectrum come to an equivalent level) by optimizing the population inversion of Er in the optical waveguide region. In particular, when the pumping light with the wavelength of 976 nm or less, or the wavelength of 981 nm or more, is irradiated to the optical waveguide region, a relative gain variation, defined by a peak gain value and a minimum gain value at the wavelength region of 1,530 to 1,560 nm, becomes smaller than 11.5%. Further, in the optical gain waveguide, preferably, the width of a wavelength range in which the relative gain variation becomes smaller than 11.5% is 36 nm or more. In this patent specification, the relative gain variation is defined as "100×(peak gain value−minimum gain value)/minimum gain value".

In the optical gain waveguide and the control method therefor according to the present invention, preferably, a relative gain variation in the optical gain waveguide becomes smaller than 10% when the pumping light having the wavelength of 976 nm or less, or the wavelength of 981 nm or more, is irradiated to the optical waveguide region, so that the gain variation of the optical gain waveguide in the C-band is minimized by optimizing the population inversion of Er in the optical waveguide region. Also, preferably, the width of the wavelength range in which the relative gain variation is smaller than 10% is 36 nm or more.

In the optical gain waveguide and the control method therefor according to the present invention, preferably, when the pumping light of the 0.98-µm wavelength band is irradiated to the optical waveguide region so that the gain variation in the C-band of the optical gain waveguide is minimized by optimizing the population inversion of Er in the optical waveguide region, the width of the pumping light wavelength range in which the relative gain variation becomes greater than 14% becomes narrower than 3 nm.

In the method of controlling optical amplification according to the present invention, to the optical waveguide region (the optical gain waveguide according to the present invention) which is doped with the Er element, it may be possible to irradiate the pumping light with an optimal wavelength in the 0.98-µm wavelength band. With the above irradiation of the pumping light, the population inversion of Er in the optical waveguide region is optimized, so that the gain variation in the C-band of the optical gain waveguide becomes minimum. At this time, in the optical gain waveguide, the relative gain variation specified by the gain and the peak gain value at a wavelength of 1,524.5 nm becomes smaller than 35%. Furthermore, it is preferable that the relative gain variation be smaller than 30%.

Here, preferably, the optical gain waveguide according to the present invention has an absorption coefficient spectrum of which full width at half maximum is 22 nm or more, in the vicinity of the 0.98-µm wavelength band.

Furthermore, in the optical gain waveguide and the control method therefor according to the present invention, it may also be possible to irradiate pumping light of the 1.48-µm wavelength band to the optical waveguide region containing the Er element. With the irradiation of the pumping light, the population inversion of Er in the optical waveguide region is optimized, so that the gain variation in the C-band of the optical gain waveguide becomes minimum. At this time, in the optical gain waveguide, the relative gain variation defined by the peak gain value and the minimum gain value in a wavelength region of 1,530 to 1,560 nm becomes smaller than 12%.

The optical amplifier according to the present invention has a higher gain than an Al-codoped EDFA at the wavelength of 1,524.5 nm, and includes an optical gain waveguide having the relative gain variation of 35% or smaller at the wavelength band of 1,524.5 to 1,557.5 nm. At this time, the optical amplifier further includes a pumping light source for supplying pumping light with a particular wavelength into the optical gain waveguide.

The optical amplifier according to the present invention may include an optical gain waveguide whose optical waveguide region is doped with Er element, and a pumping light source. At this time, the pumping light source supplies pumping light with a particular wavelength into the optical waveguide region so that the relative gain variation per unit wavelength band becomes 0.3%/nm or less throughout the whole signal wavelength region, in the gain spectrum of the optical gain waveguide.

The present invention will be more fully understood from the detailed description given hereinbelow and the accompanying drawings, which are given by way of illustration only and are not to be considered as limiting the present invention.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will be apparent to those skilled in the art from this detailed description.

BRIEF DESCRIPTION OF THE DRAWINGS

FIG. 2 shows an EDF dimension table, in which EDF samples-a to -e prepared as the optical gain waveguide according to the present invention are collected;

FIG. 18 shows a table in which the respective relative gain variations of the EDF samples-a, -b, -d and -e, and the hybrid EDF samples-(b+a) and -(d+a), are collected;

FIG. 23 shows a table illustrating a relative gain variation 1 defined by both the two peak gain values, which can be read from FIG. 22, and the minimum gain value at the wavelength band of 1,530 to 1,560 nm produced in the vicinity of a wavelength of 1,538 nm; and a relative gain variation 2 at the band of a wavelength of 1,524.5 nm as a minimum wavelength;

DETAILED DESCRIPTION OF THE PREFERRED EMBODIMENTS

In the following, embodiments of the present invention will be described in detail using FIGS. 1 to 26. In the description of the figures, like elements are referred to by like symbols, and the duplication of explanation is omitted. Further, in the following description, a silica-based optical fiber, in particular, an EDF (Erbium-doped optical fiber) whose core region is doped with the Er element, is described.

Figure 1:
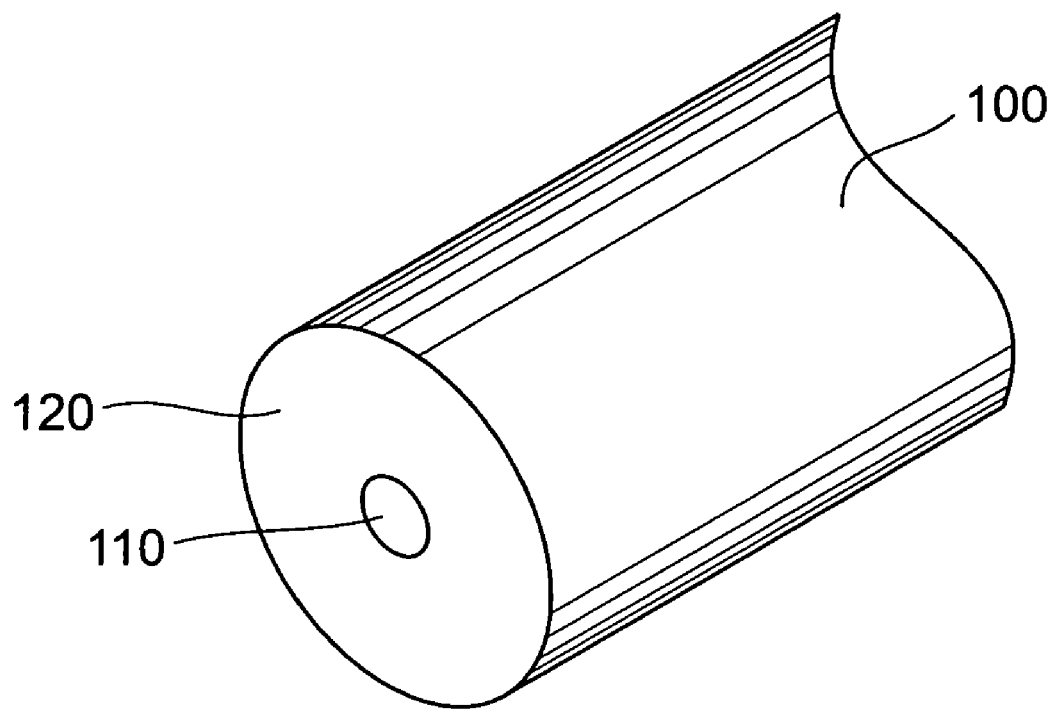
FIG. 1 shows a diagram illustrating a cross-sectional structure of an optical gain waveguide according to the present invention.

FIG. 1 shows a diagram illustrating a cross-sectional structure of the EDF, as an optical gain waveguide according to the present invention. FIG. 2 shows an EDF dimension table, in which EDF samples-a to -e prepared as the optical gain waveguide according to the present invention are collected.

As shown in FIG. 1, an EDF 100 comprises a core region 110 as an optical waveguide region (in which the Er element is doped), and a cladding region 120 provided surround the core region 110. Further, an EDF sample-a is an Al-codoped EDF having neither the B element nor the F element doped in the core region 110. In contrast, in each of EDF samples-b to -d the B element is further doped in the core region 110 in addition to the Er element, while in EDF sample-e the F element is further doped in the core region 110 in addition to the Er element.

In FIG. 2, there are shown concentrations of the B element (wt %), the Ge element (wt %), the Al element (wt %), and the Er element (wt ppm), peak wavelength (nm) of an unsaturated absorption $\alpha$, absorption (dB/m) at a wavelength of 1.53 $\mu$m, mode field diameter ($\mu$m), cutoff wavelength ($\mu$m), fusion-splicing loss 1 (dB) with a normal single mode optical fiber having zero dispersion at the 1.3-$\mu$m wavelength band, and fusion-splicing loss 2 with an optical fiber HI980 manufactured by Corning Inc, respectively.

Figure 3:
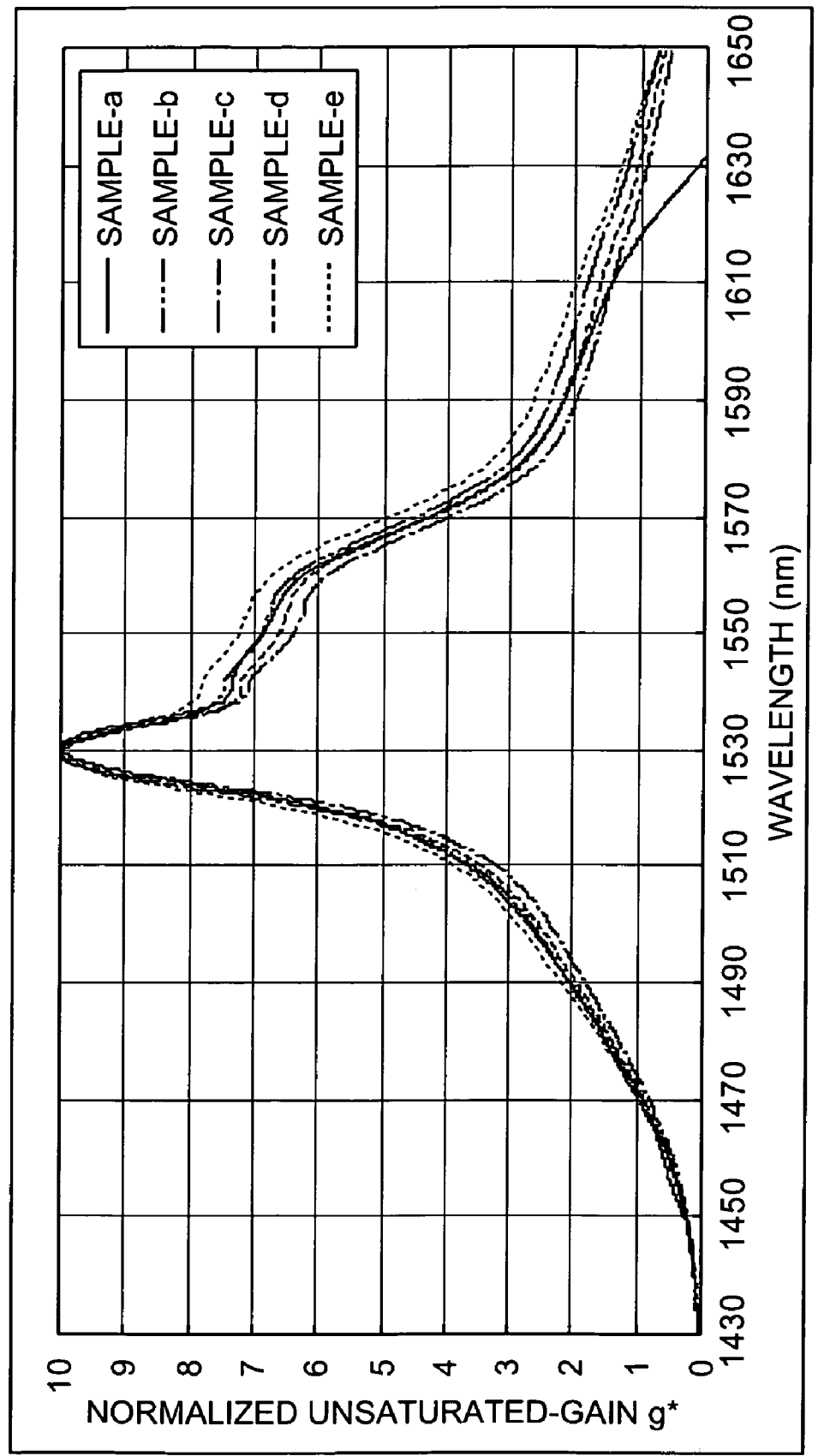
FIG. 3 shows a chart illustrating wavelength dependency of an unsaturated gain per unit length g* in each of EDF samples-a to -e.
Figure 4:
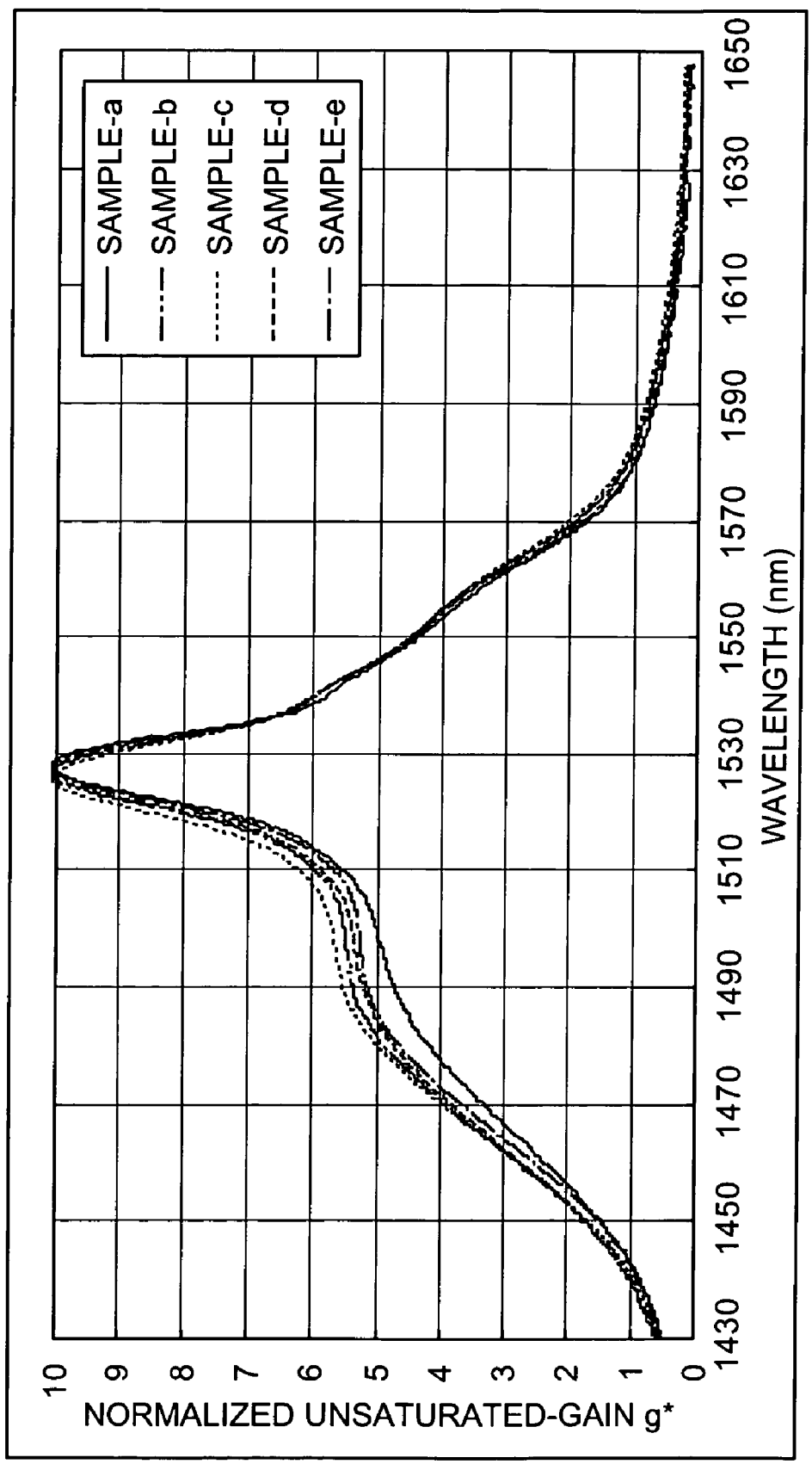
FIG. 4 shows a chart illustrating wavelength dependency of the unsaturated absorption per unit length α in each of EDF samples-a to -e.
Figure 5:
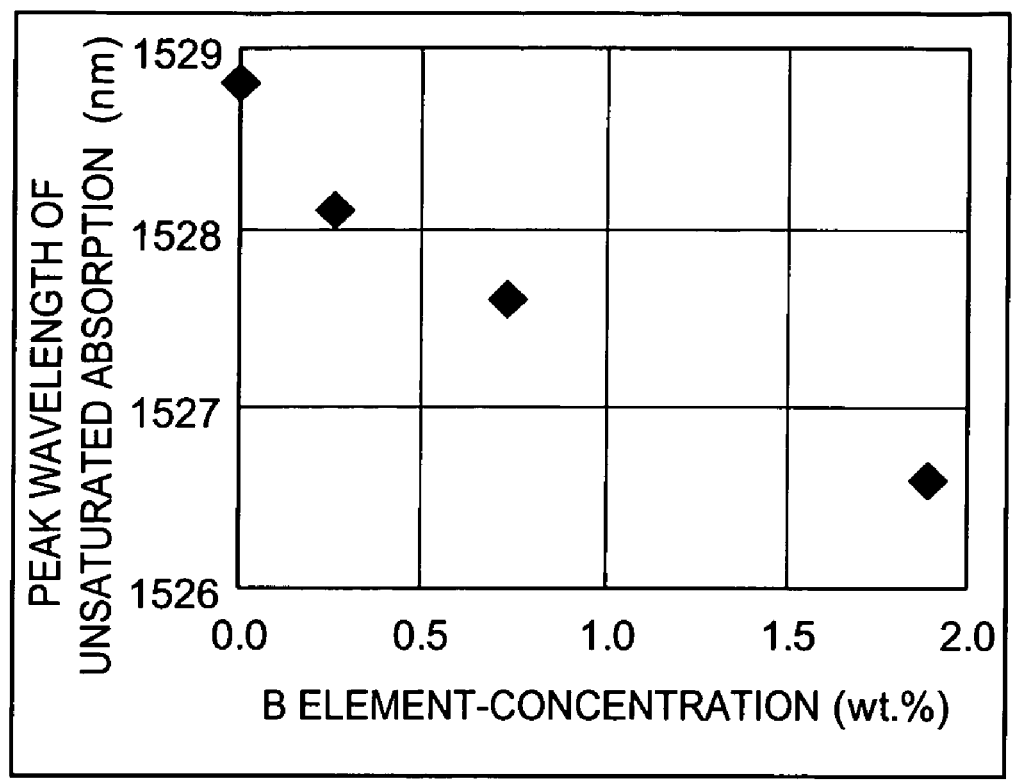
FIG. 5 shows a chart illustrating the relationship between a peak wavelength of the unsaturated absorption α and the concentration of the B element, in regard to each of EDF samples-a to -d.

FIG. 3 shows a chart illustrating wavelength dependency of the unsaturated gain per unit length g* (dB/m) (hereinafter, g* is simply referred to unsaturated gain), in each of EDF samples-a to -e. FIG. 4 shows a chart illustrating wavelength dependency of the unsaturated absorption per unit length $\alpha$ (dB/m) (hereinafter, $\alpha$ is simply referred to unsaturated absorption) in each of EDF samples-a to -e. In these FIGS. 3 and 4, both the unsaturated gain g* and the unsaturated absorption $\alpha$ are normalized, so that each peak value becomes 10. Also, FIG. 5 shows a chart illustrating the relationship between the peak wavelength of the unsaturated absorption $\alpha$ and the concentration of the B element, in regard to the respective EDF samples-a to -d.

As can be understood from FIGS. 3 to 5, in each of EDF samples-b to -d, the unsaturated gain g* gradually arises in the region near the 1.55-$\mu$m wavelength band (hereinafter, the region is referred to as satellite peak, in contrast to a main peak of the 1.53-$\mu$m wavelength band) by increasing the concentration of the B element, which is expected to contribute to gain flatness. Also, as can be understood from FIG. 4, by increasing the concentration of the B element, an effect such that the peak wavelength in the unsaturated absorption $\alpha$ (as well as in the unsaturated gain g*) is shifted to the shorter wavelength side can be obtained.

The above-mentioned effect is appropriate not only for optical amplification in the C-band (1,530 nm to 1,565 nm), but also for use that requires optical amplification in the shorter wavelength side. One of such uses is channel amplification having a center wavelength of 1,531 nm in CWDM (coarse WDM). In CWDM, since a distributed feedback laser diode (DFB-LD) without temperature adjustment is employed as a signal light source, the signal light wavelength may vary in the range of ±6.5 nm. Therefore, it is necessary to obtain a sufficient gain for practical use, throughout the whole wavelength region of 1,524.5 nm to 1,537.5 nm.

However, in the EDF sample-a, there is a large drop of gain at a wavelength of 1,524.5 nm, as compared to the gain in the C-band, which is not suitable for use in CWDM. In FIG. 1-(b) of the aforementioned Document 3, as compared to a peak gain value of 29.2 dB, the gain at the wavelength of 1,524.5 nm is only 20 dB, which is in the level of approximately ⅔ of the peak gain value. When obtaining the relative gain variation, indeed, the result is 46% (=(29.2−20)/20). Furthermore, when mentioning the EDF shown in FIG. 5 of the above Document 3, it is further disadvantageous because the peak gain value at the 1.53-$\mu$m wavelength band is substantially shifted to the longer wavelength side than in the case of a normal EDF. As a result, the gain at the wavelength of 1,524.5 nm is merely to the degree of 17 dB. When obtaining the relative gain variation, the result reaches up to 82% (=(31−17)/17).

Figure 6:
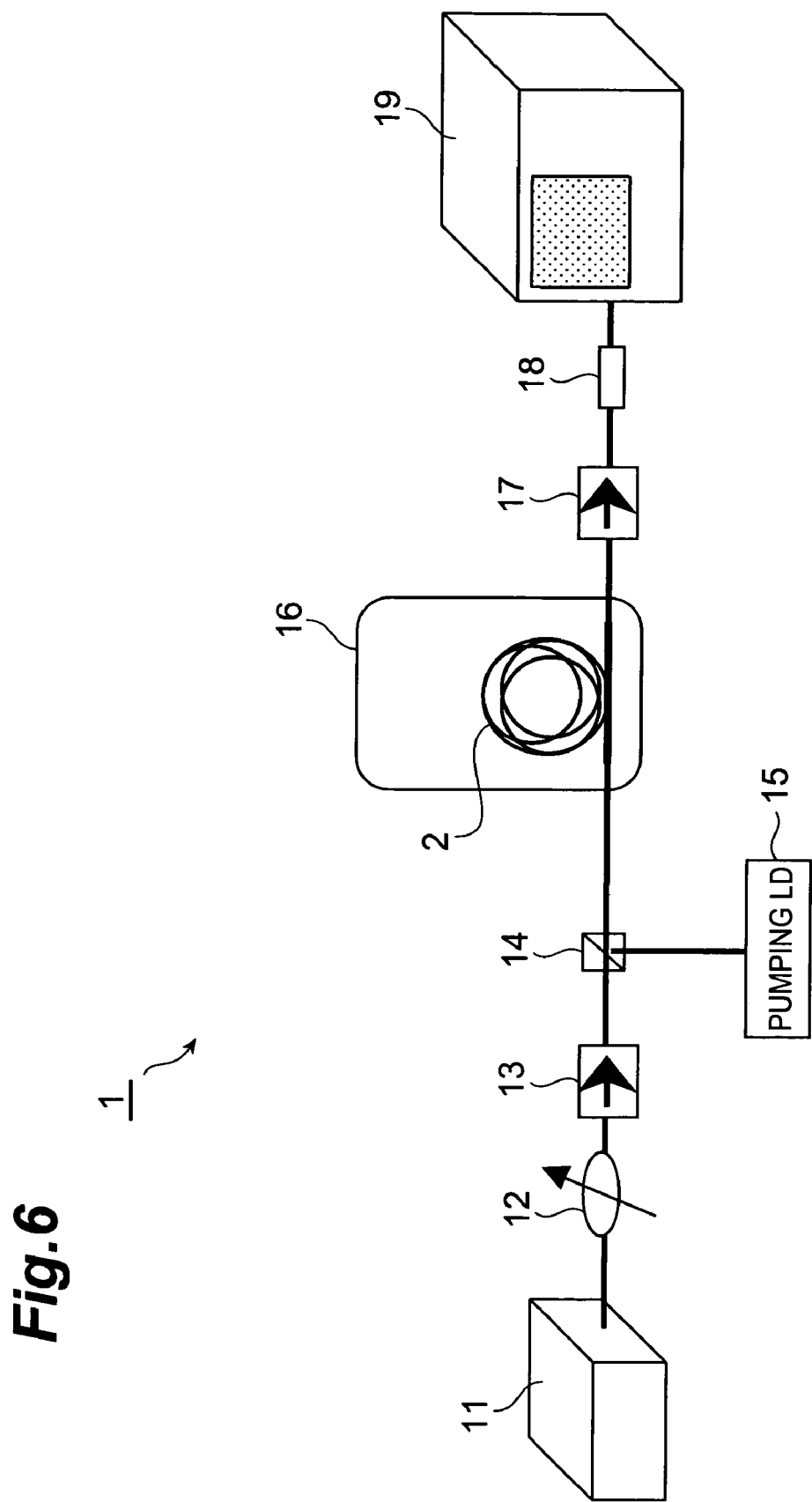
FIG. 6 shows a diagram illustrating a configuration of an evaluation system (including a portion of the optical amplifier according to the present invention) used for evaluating the gain spectrum of each of EDF samples-a to -e.

FIG. 6 shows a diagram illustrating a configuration of an evaluation system used for evaluating each gain spectrum of EDF samples-a to -e. The evaluation system 1 shown in this figure is aimed to evaluate the gain spectrum of the EDF 2, and comprises a white light source 11, a variable optical attenuator 12, an optical isolator 13, a WDM coupler 14, a pumping light source 15, a thermostatic chamber 16, an optical isolator 17, an optical attenuator 18 and an optical spectrum analyzer 19. In addition, the optical amplifier according to the present invention comprises an input terminal for taking in signal light, and an output terminal for outputting amplified signal light, and comprises at least, an optical isolator 13, a WDM coupler 14, a pumping light source 15, an EDF 2 (an optical gain waveguide according to the present invention), and an optical isolator 17 between the input terminal and the output terminal.

The white light source 11 outputs C-band (and S-band) white light. The variable optical attenuator 12 has a variable attenuation factor, which attenuates the white light output from the white light source 11, and outputs the attenuated light to the optical isolator 13. Each of the optical isolators 13 and 17 transmits the light in the forward direction from the white light source 11 toward the optical spectrum analyzer 19, while in the backward direction, light transmission is inhibited.

The WDM coupler 14 outputs the light having arrived from the optical isolator 13 to the EDF 2, and outputs the pumping light having arrived from the pumping light source 15 via the WDM coupler 14 to the EDF 2 as well. The pumping light source 15 outputs the pumping light to the WDM coupler 14. The thermostatic chamber 16 accommodates the EDF 2 therein, so as to maintain the temperature of the EDF 2 at a predetermined value. As the EDF 2, either one of the above-mentioned EDF samples-a to -e is used.

The optical attenuator 18 has a fixed attenuation factor of 10 dB, which attenuates the light output from the optical isolator 17, and outputs the attenuated light to the optical spectrum analyzer 19. The optical spectrum analyzer 19 receives the light (light to be measured) outputted from the optical attenuator 13, and measures the spectrum of the light to be measured.

The gain spectrum measurement of the EDF 2 (samples-a to -e) using the evaluation system 1 has been performed in the following manner. The pumping light (having any wavelength in the 0.98-$\mu$m wavelength band, and fixed power of 150 mW) outputted from the pumping light source 15 was supplied to the EDF 2 via the WDM coupler 14. The white light, which was outputted from the white light source 11 and passed through the variable optical attenuator 12, the optical isolator 13 and the WDM coupler 14, was then amplified by the EDF 2 housed in the thermostatic chamber 16 of which temperature was 25° C. At that time, the entire power of the white light being inputted to the EDF 2 was 0 dBm. Then, the light amplified in the EDF 2 arrived at the optical spectrum analyzer 19 via the optical isolator 17 and the optical attenuator 18. By use of the optical spectrum analyzer 19, the spectrum measurement of the light to be measured was performed.

Figure 7:
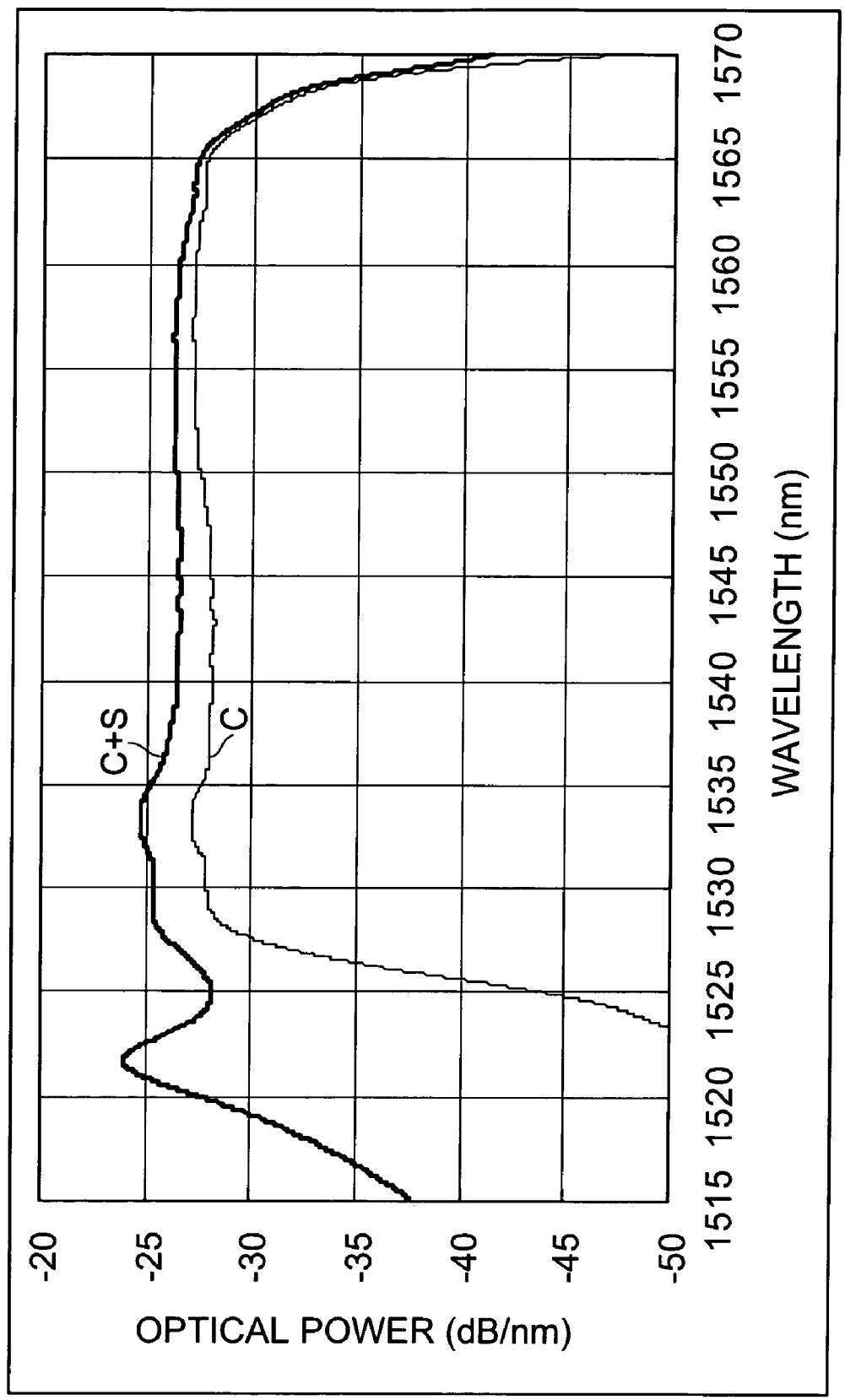
FIG. 7 shows a spectrum obtained from an optical spectrum analyzer when an EDF is not inserted between a WDM coupler and an optical isolator in the evaluation system shown in FIG. 6.

In addition, as the white light source 11, an S-band ASE light source, in which C-band ASE light is eliminated from ASE light generated in the EDF, was commonly used, in addition to a commercially available C-band, flat-spectrum white light source. FIG. 7 shows a spectrum obtained from the optical spectrum analyzer 19, in case that the EDF 2 was not inserted between the WDM coupler 14 and the optical isolator in the evaluation system 1 shown in FIG. 6. In FIG. 7, the bold line shows the spectrum obtained when both the C-band flat-spectrum white light source and the S-band ASE light source were used as the white light source 11. The thin line shows the spectrum obtained when only the C-band, flat-spectrum white light source was used as the white light source 11.

The gain spectrum of the EDF 2 can be obtained from the difference between the spectrum obtained by the optical spectrum analyzer 19 while the EDF 2 is inserted between the WDM coupler 14 and the optical isolator, and the spectrum obtained by the optical spectrum analyzer 19 while the EDF 2 is not inserted between the WDM coupler 14 and the optical isolator (FIG. 7).

Figure 8:
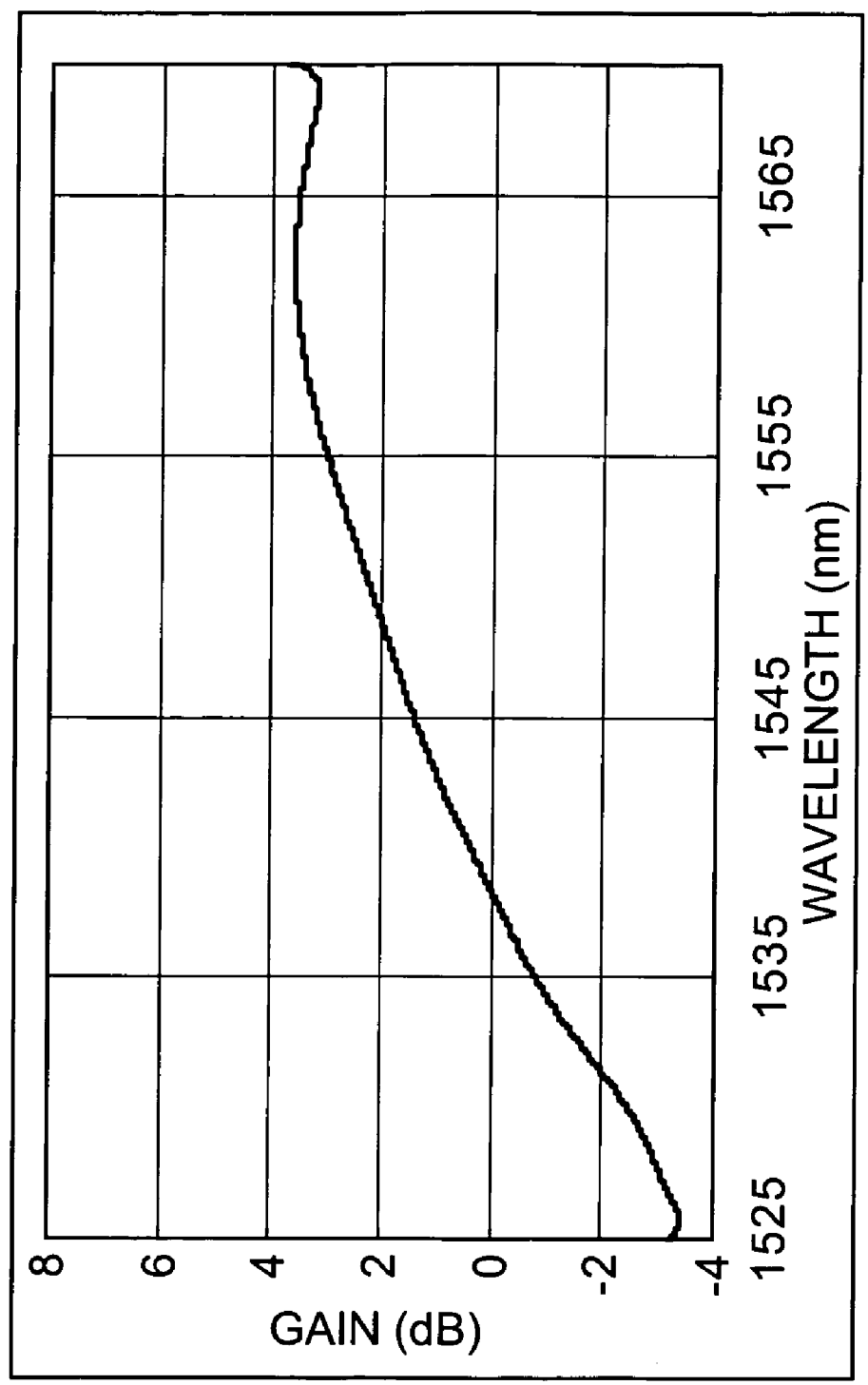
FIG. 8 shows an EDF gain spectrum in regard to the sample-c, obtained through the measurement using the evaluation system shown in FIG. 6.

FIG. 8 shows the gain spectrum of the EDF sample-c (having a length of 3 m), obtained through the measurement using the evaluation system 1 shown in FIG. 6. It was expected that the EDF sample-c has the flattest wideband gain spectrum from the viewpoint of each wavelength dependency of the unsaturated gain g* and the unsaturated absorption a shown in FIGS. 3 and 4. However, the EDF sample-c has a shortened pumping lifetime due to an excessively high concentration of the B element. As shown in FIG. 8, even when the EDF sample-c is pumped by the pumping light of the 0.98-μm wavelength band with the power of 180 mW, the characteristic merely shows a transition from absorption to gain at the best. Not only the gain spectrum shape but also an effect of the pumping lifetime upon pumping efficiency is important.

Figure 9:
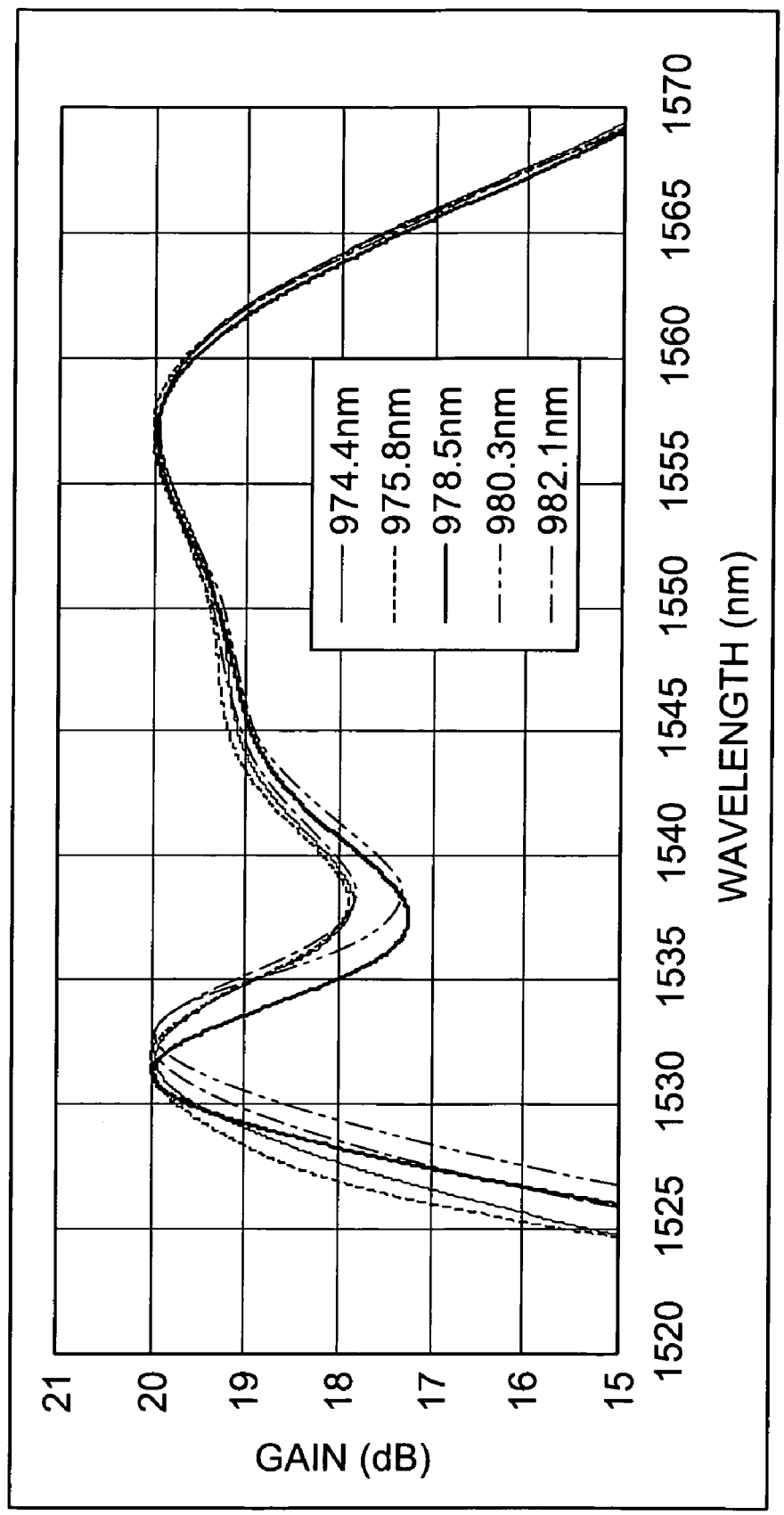
FIG. 9 shows an EDF gain spectrum in regard to the sample-a, obtained through the measurement using the evaluation system shown in FIG. 6.
Figure 10:
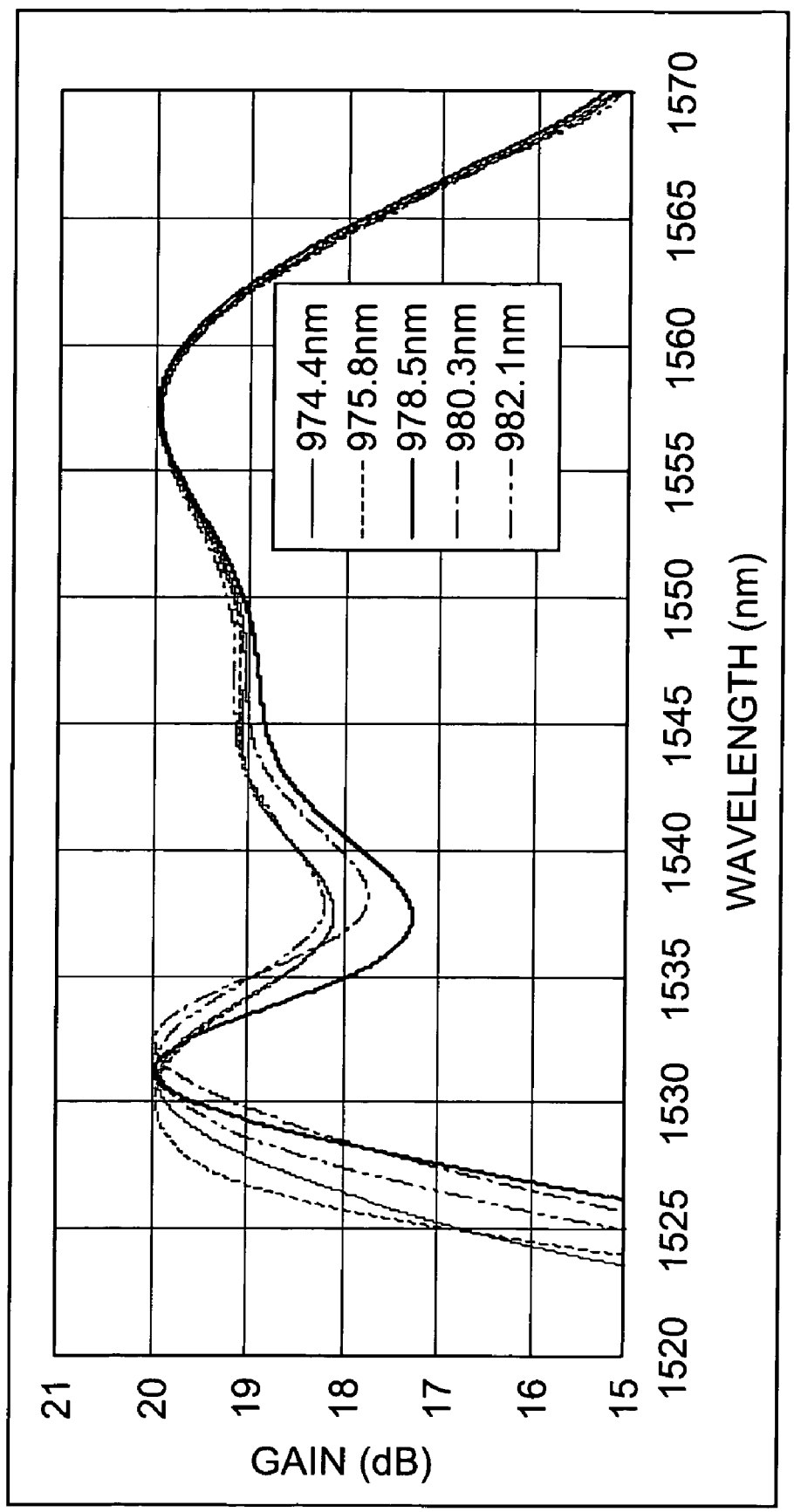
FIG. 10 shows an EDF gain spectrum in regard to the sample-b, obtained through the measurement using the evaluation system shown in FIG. 6.
Figure 11:
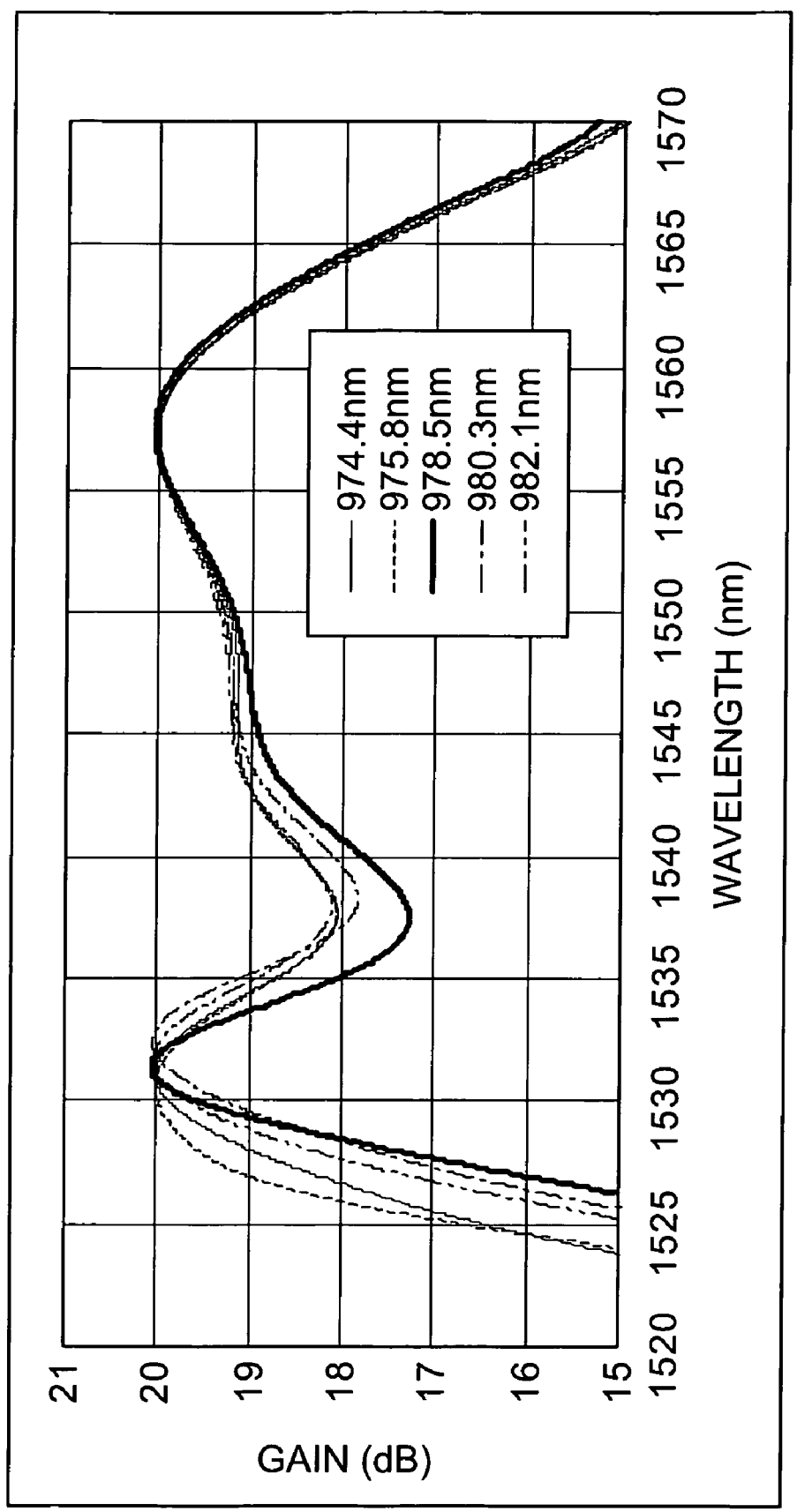
FIG. 11 shows an EDF gain spectrum in regard to the sample-d, obtained through the measurement using the evaluation system shown in FIG. 6.
Figure 12:
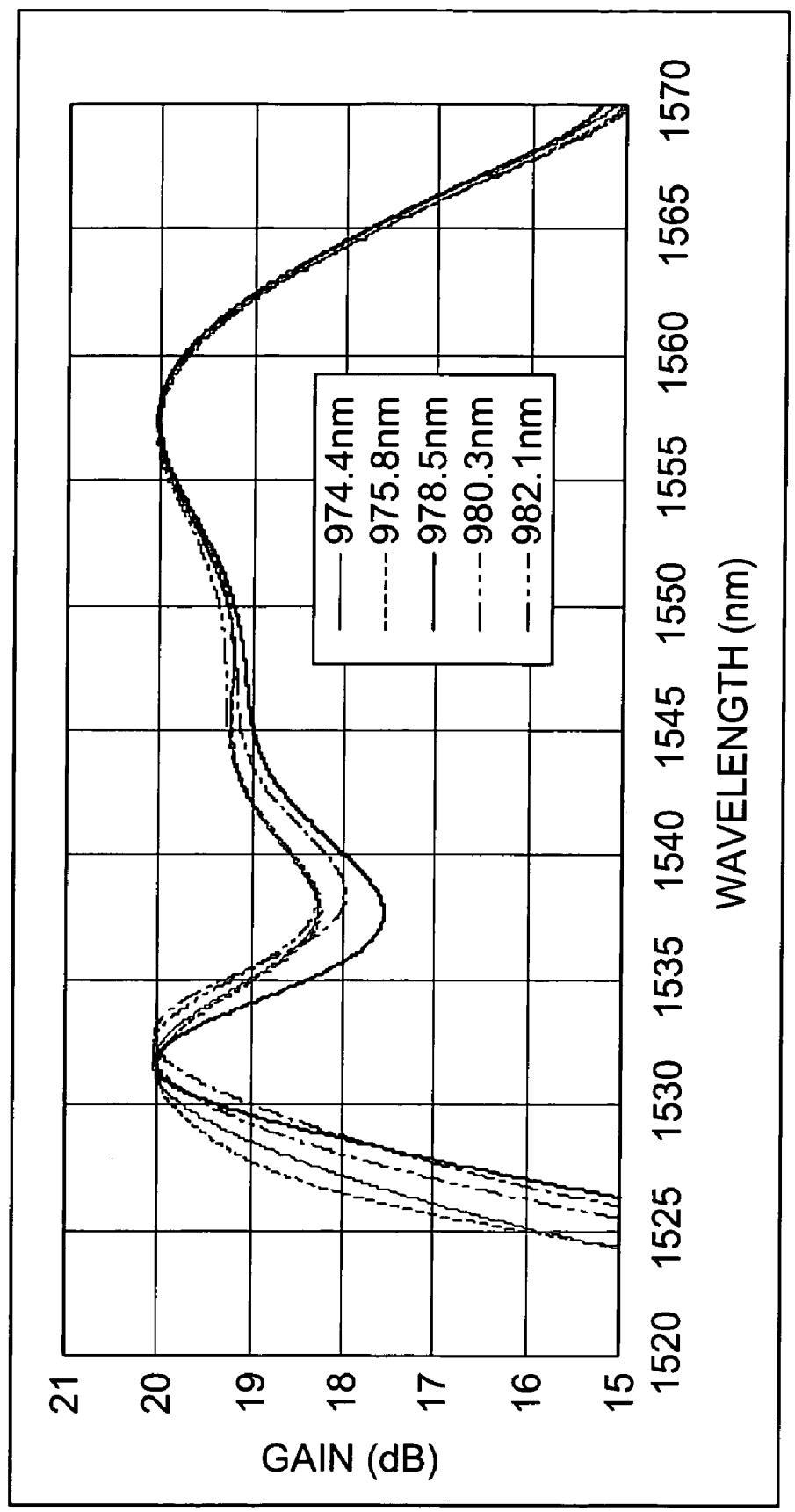
FIG. 12 shows an EDF gain spectrum in regard to the sample-e, obtained through the measurement using the evaluation system shown in FIG. 6.

FIG. 9 shows the gain spectrum of the EDF sample-a, which was measured using the evaluation system 1 shown in FIG. 6. FIG. 10 shows the gain spectrum of the EDF sample-b measured using the evaluation system 1 shown in FIG. 6. FIG. 11 shows the gain spectrum of the EDF sample-d measured using the evaluation system 1 shown in FIG. 6. Also, FIG. 12 shows the gain spectrum of the EDF sample-e measured using the evaluation system 1 shown in FIG. 6. Here, the pumping wavelengths used in the measurement were the following five wavelengths: 974.4 nm, 975.8 nm, 978.5 nm, 980.3 nm, and 982.1 nm. Furthermore, the population inversion of Er in the core region 110 was optimized so that the two gain peaks in the C-band became the same level as each other. Also, the gains were normalized so that the peak gain values became 20 dB. In regard to the EDF gain spectra of the EDF samples-a, -b, -d and -e, it was possible to achieve gains, respectively, though there were differences in the pumping efficiencies.

Figure 13:
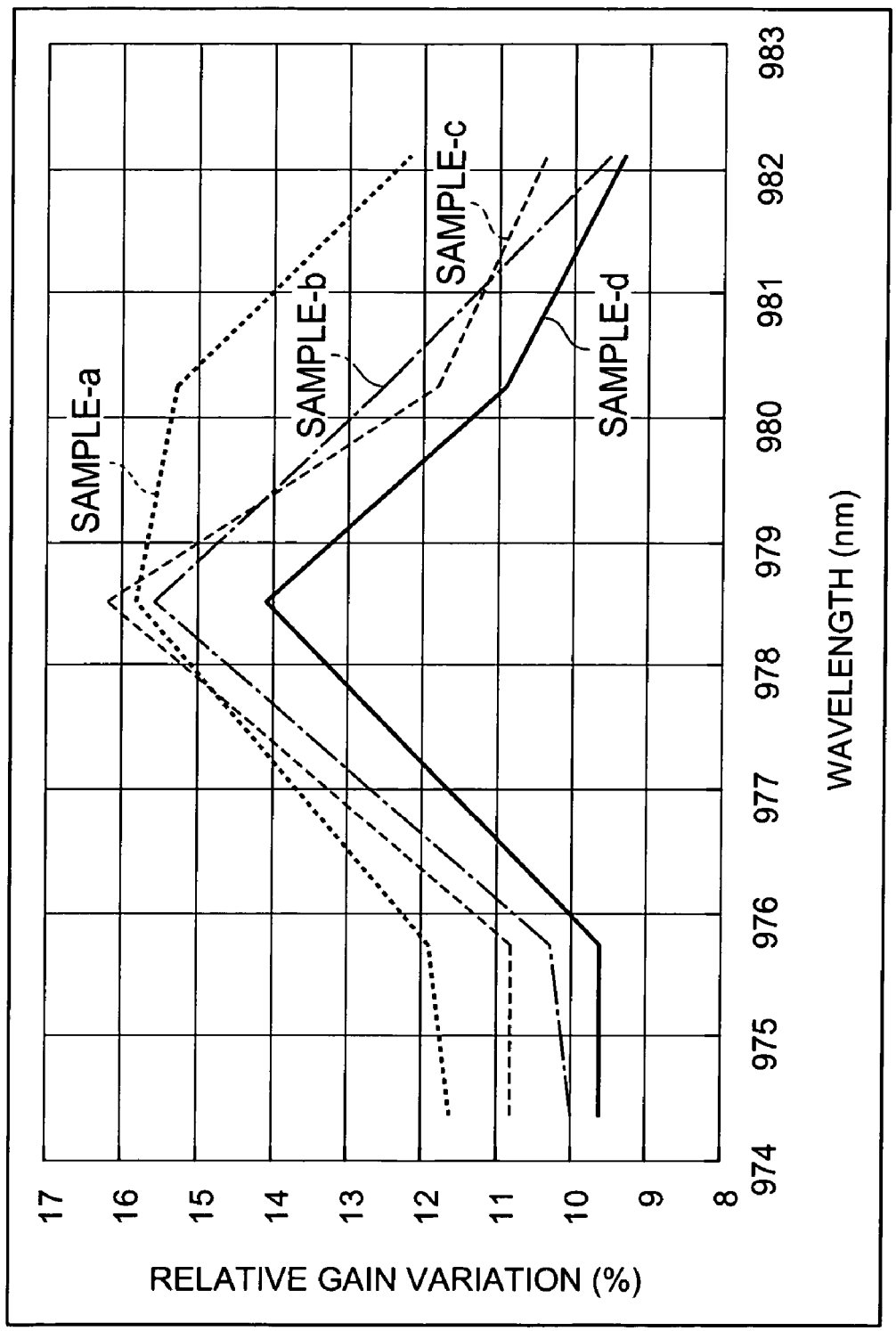
FIG. 13 shows a chart illustrating the relationship between a relative gain variation and a pumping light wavelength, in regard to the respective EDF samples-a, -b, -d and -e.
Figure 14:
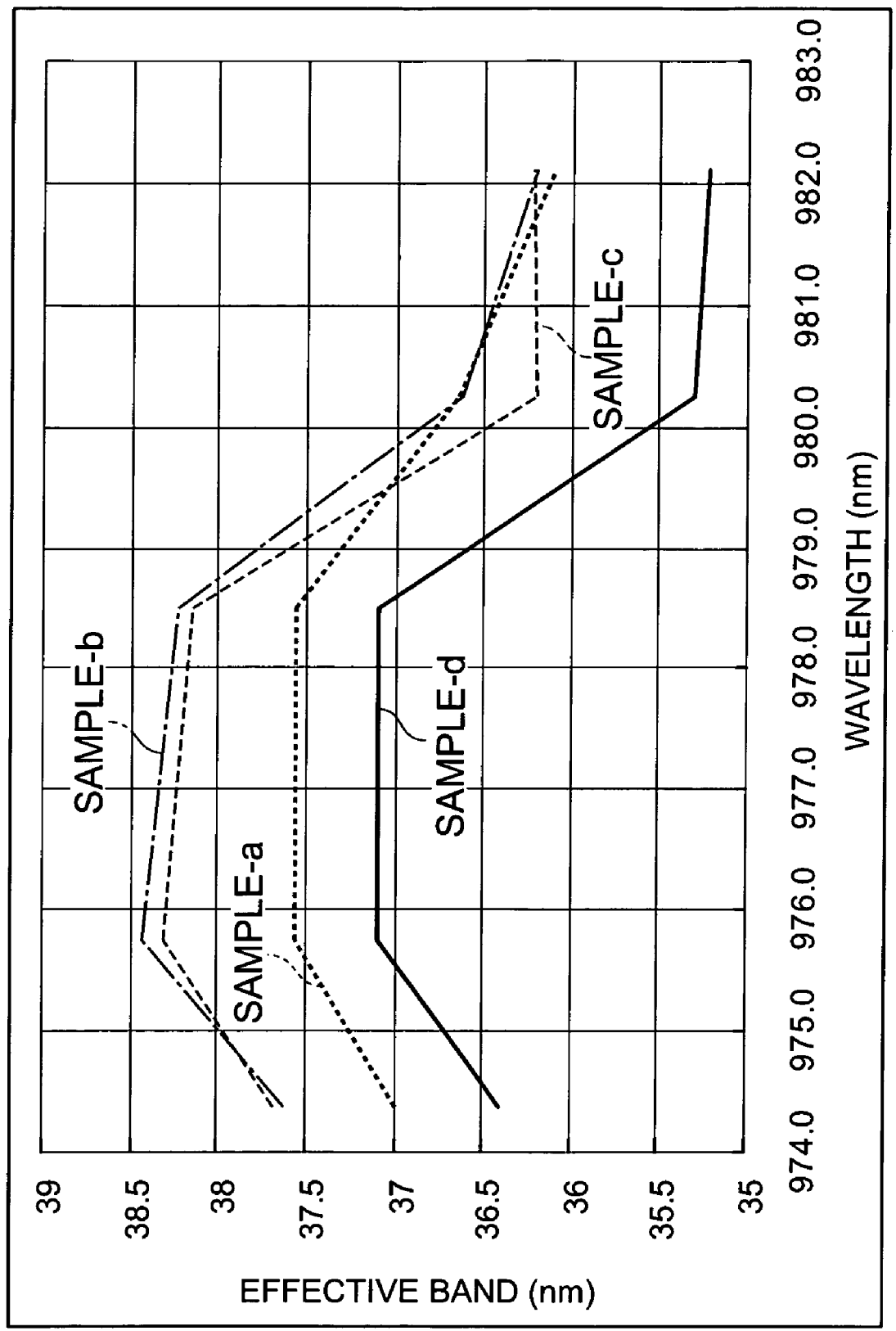
FIG. 14 shows a chart illustrating the relationship between an effective band and a pumping light wavelength, in regard to the respective EDF samples-a, -b, -d and -e.
Figure 15:
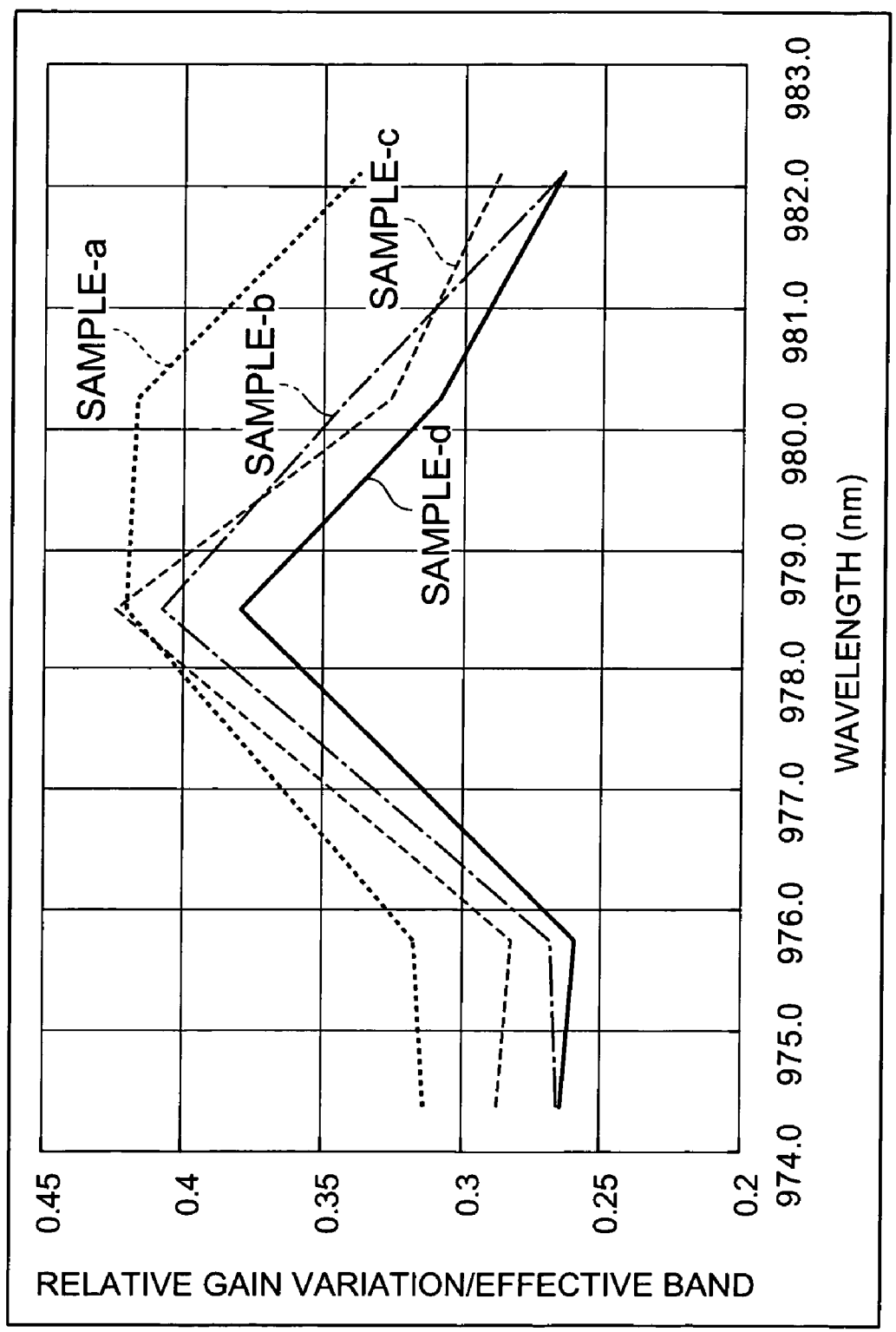
FIG. 15 shows a chart illustrating the relationship between a ratio (relative gain variation/effective band) and a pumping light wavelength, in regard to the respective EDF samples-a, -b, -d and -e.

FIG. 13 shows a chart illustrating the relationship between a relative gain variation and a pumping light wavelength, in regard to the respective EDF samples-a, -b, -d and -e. FIG. 14 shows a chart illustrating the relationship between an effective band and a pumping light wavelength, in regard to the respective EDF samples-a, -b, -d and -e. Also, FIG. 15 shows a chart illustrating the relationship between a ratio (relative gain variation/effective band) and a pumping light wavelength, in regard to the respective EDF samples-a, -b, -d and -e. These FIGS. 13 to 15 are obtained from FIGS. 9 to 12. The relative gain variation is defined as "100×((peak gain value)−(minimum gain value in the wavelength region of 1,530 nm to 1,560 nm))/(minimum gain value in the wavelength region of 1,530 nm to 1,560 nm)". The effective band is a bandwidth in which the gains become greater than the minimum gain value in the wavelength region of 1,530 nm to 1,560 nm being produced in the vicinity of the wavelength of 1,538 nm. Furthermore, the ratio (relative gain variation/effective band) is meant for a relative gain variation per unit bandwidth.

From the above figures, the following knowledge is obtained. Namely, in the respective EDF samples-a, -b, -d and -e, the relative gain variation is large when the pumping light wavelength is in the vicinity of 978 nm, whereas the relative gain variation is small when the pumping light wavelength is 976 nm or less, or 981 nm or more. Each relative gain variation of the EDF samples-b, -d and -e is 11% or less when the pumping light wavelength is 976 nm or less, or 981 nm or more. In particular, as to the EDF sample-e, the relative gain variation is 10% or less when the pumping light wavelength is 976 nm or less, or 981 nm or more. On the other hand, as to the EDF sample-a, the relative gain variation never becomes 11% or less whatever value the pumping light wavelength may have.

Here, it is worthy of notice that, in the EDF samples-d and -e, the unsaturated gain g* in the satellite region of the 1.55-μm wavelength band is rather lower than in the normal EDF (sample-a), as far as FIG. 3 is viewed. In the EDF sample-e, the relative height of the satellite peak in the 1.55-μm wavelength band to the main peak in the 1.53-μm wavelength band is the lowest. However, since the slope angle in the satellite region is nearest to the slope angle on the longer wavelength side of the main peak, the above two slopes are connected most smoothly. Therefore, as shown in FIGS. 9 to 15, it is considered that the relative gain variation has been improved. In regard to each glass sample having the composition shown in Table 2 of the aforementioned Document 4, there has been shown a case of expanding the full width at half maximum in the fluorescence property, by the use of fluorine doping. On the other hand, it is apparent that the EDF sample-e according to the present invention does not utilize such effect of fluorine doping (namely, expansion of the full width at half maximum in the unsaturated gain g*) disclosed in the Document 4.

Further, the EDF sample-a has a wide pumping wavelength range where a relative gain variation is deteriorated. For example, the wavelength range having the relative gain variation exceeding 14% is approximately 4 nm in the case of the EDF sample-a. In contrast, each corresponding wavelength range in the other EDF samples-b, -d and -e is no greater than 2 nm. In particular, in the case of the EDF sample-e, there is substantially no wavelength range where the relative gain variation exceeds 14%.

Furthermore, when comparing the case of irradiating pumping light of the wavelength of 976 nm or less with the case of irradiating pumping light of the wavelength of 981 nm or more, the former case produces a wider effective band. In each of EDF samples-b, -d and -e, the effective band exceeds 36 nm while maintaining the relative gain variation below 11%. In particular, each effective band of EDF samples-b and -d exceeds 38 nm.

When further focusing attention on a relative gain variation per unit band as a parameter considering both the relative gain variation and the effective band, in case of the EDF sample-a, it is not possible to have the relative gain variation per unit band of 0.3 (%/nm) or less, whatever value the pumping wavelength is adjusted to. In contrast, in the respective cases of the EDF samples-b, -d and -e, it is possible to have the relative gain variation per unit band of 0.3 (%/nm) or less, in the pumping wavelength region of a wavelength of 976 nm or less, or a wavelength of 981 nm or more. In the case of the EDF sample-e, which produces the best value, the relative gain variation per unit band comes to as low as 0.26, when the pumping light with the wavelength of 976 nm is irradiated.

As described above, the B doping affects not only the gain spectrum but also the pumping efficiency remarkably. Therefore, in order to verify the practicability of the EDF having new composition, such as the samples-b, -d and -e, taking both the gain spectrum and the pumping efficiency into consideration, the EDF gain spectra were evaluated according to the following procedure. First, in a similar way to the above embodiment, the input signal light power was set at 0 dB, and the pumping power in the forward direction was set at 150 mW. Next, the pumping wavelength was set at 976 nm where expansion of the effective band of the gain spectrum is most remarkable. Then, each length of the EDF samples was adjusted so that the respective gain peaks at the 1.53-µm wavelength band and the 1.56-µm wavelength band become the same level as each other. More specifically, the length of the EDF sample-a was set at 6 m, the length of the EDF sample-b was set at 4.7 m, the length of the EDF sample-d was set at 4.2 m, and also, the length of the EDF sample-e was set at 1.1 m.

In addition, in order to compensate deterioration of the pumping efficiency in the B/Al-codoped EDF, a hybrid sample obtained by connecting the sample-b (3.3 m in length) with the sample-a (2.0 m in length) and a hybrid sample obtained by connecting the sample-d (2.9 m in length) with the sample-a (2.0 m in length) were also evaluated. The allocation of each EDF length in each hybrid structure is optimized so as to increase the pumping efficiency without deteriorating the gain flatness. The gain spectra and the relative gain variations in the above EDF examples are shown in FIGS. 16 to 18.

Figure 16:
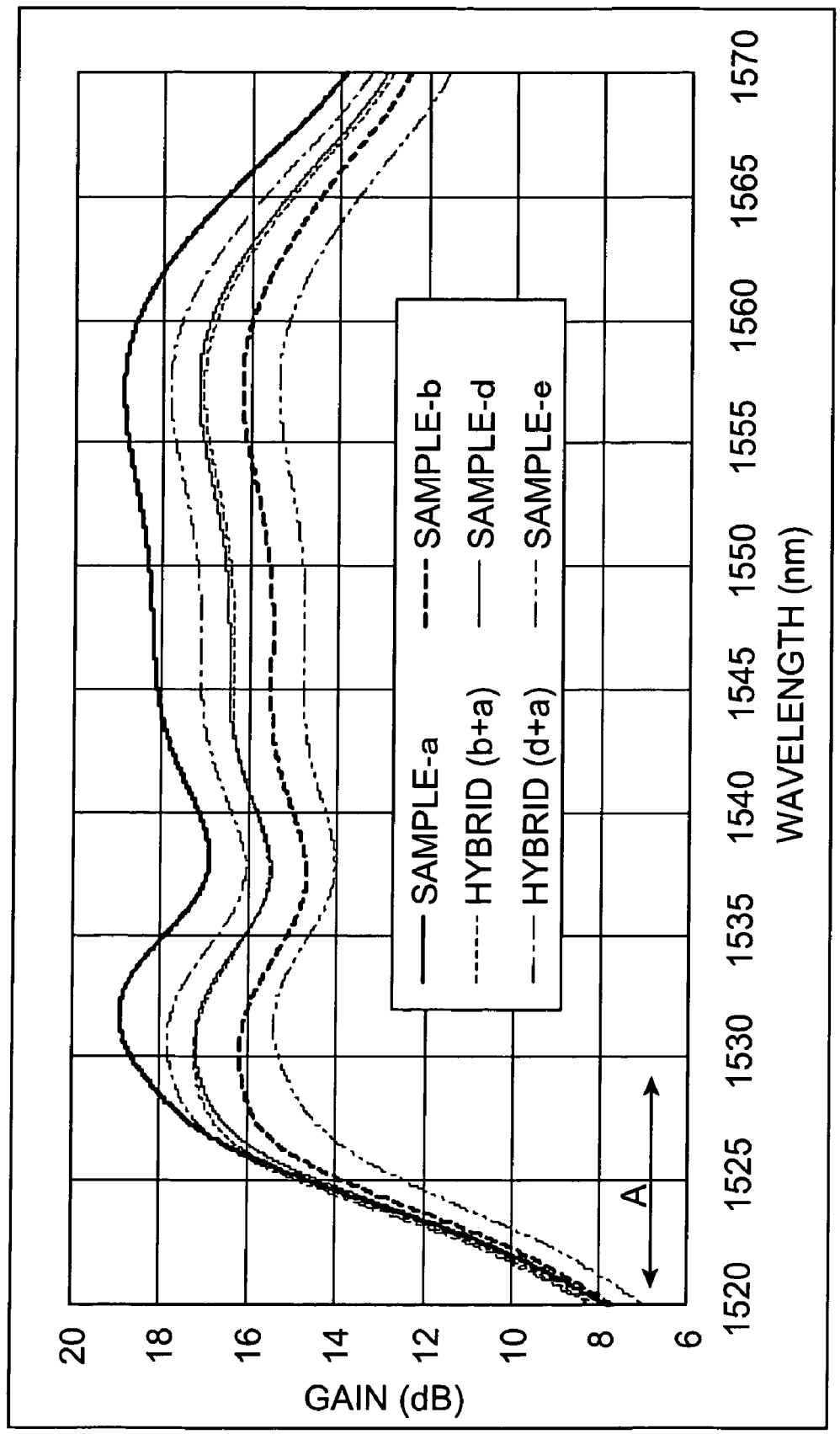
FIG. 16 shows each gain spectrum of the respective EDF samples-a, -b, -d and -e, and respective hybrid EDF samples-(b+a) and -(d+a)

Here, FIG. 16 shows each gain spectrum of the respective EDF samples-a, -b, -d and -e, and respective hybrid EDF samples-(b+a) and -(d+a). FIG. 17 shows an enlarged diagram of a band area A shown in FIG. 16. Also, FIG. 18 shows a table in which the relative gain variations of the EDF samples-a, -b, -d and -e, and the hybrid EDF samples-(b+a) and -(d+a) are collected. In particular, in the EDF samples-b and -d, the gain spectra extend to the shorter wavelength side, and therefore conversion to the use for CWDM is expected. Accordingly, the gain at a wavelength of 1,524.5 nm was assumed to be a minimum gain value, instead of using the minimum value produced in the vicinity of a wavelength of 1,538 nm. In FIG. 18, there are shown a relative gain variation 1, which is obtained when the minimum value in the vicinity of the wavelength of 1,538 nm is used as the minimum gain value in the wavelength range of 1,530 nm to 1,560 nm, and a relative gain variation 2 which is obtained when the gain at the wavelength of 1,524.5 nm is used as the minimum gain value in the wavelength range of 1,530 nm to 1,560 nm.

Figure 17:
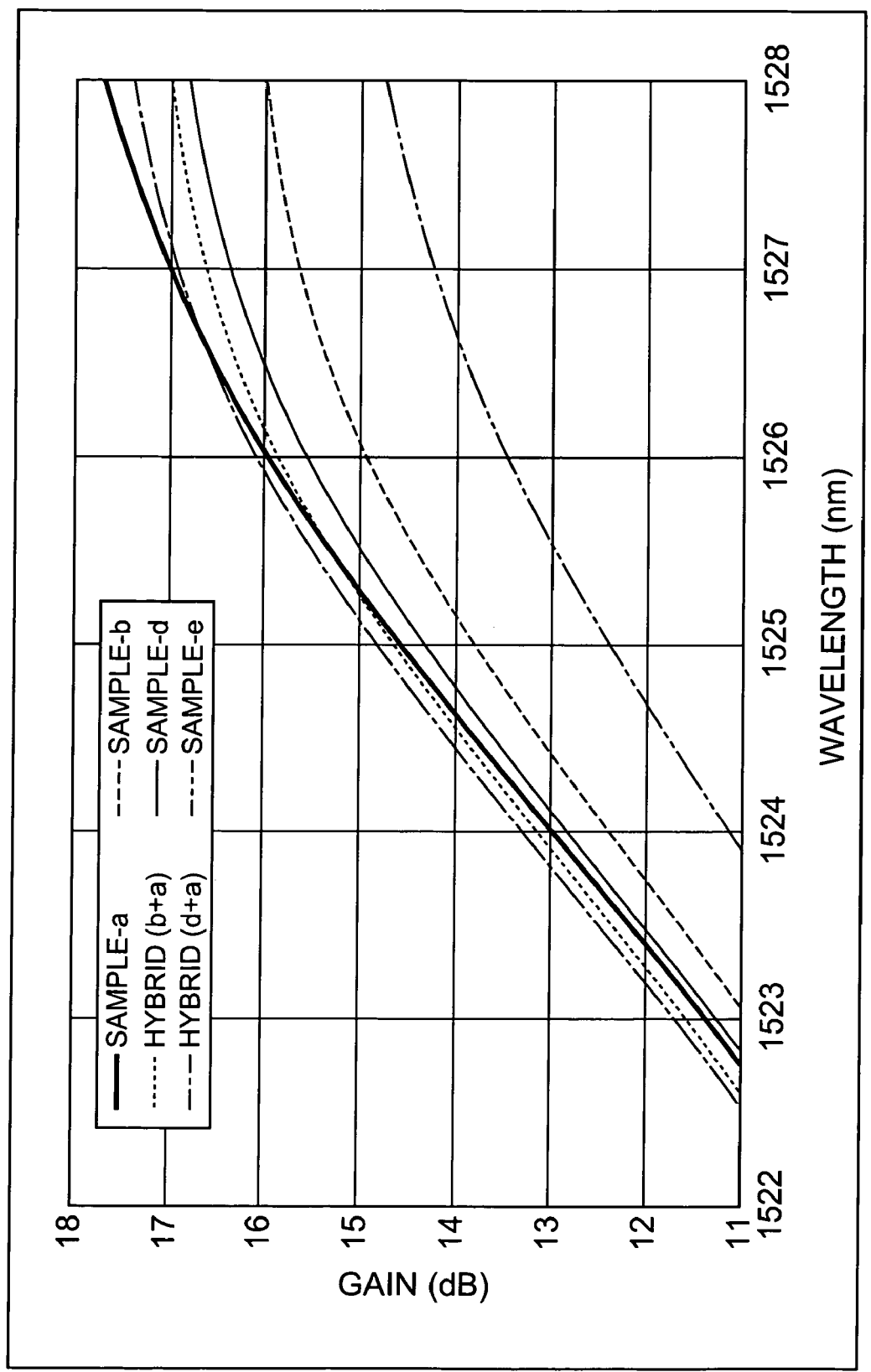
FIG. 17 shows an enlarged diagram of a band area A shown in FIG. 16.

From the above FIGS. 16 through 18, the following knowledge is obtained.

Namely, from the relative gain variation of the respective EDF samples-a, -b and -d, it is understood that, if the B concentration is increased, the relative gain variation is improved, whereas the pumping efficiency is decreased. In case of a single body, i.e. in each of the EDF samples-b and -d, it is not possible to obtain a higher gain than in the normal EDF at the wavelength of 1,524.5 nm. Also, in regard to the relative gain variation 1 and the relative gain variation 2, deterioration of the relative gain variation caused by introducing the hybrid structure hardly occurs. By use of the hybrid structure, in each of the EDF sample-(b+a) and the sample-(d+a), it becomes possible to obtain a higher gain than in the normal EDF at the wavelength of 1,524.5 nm. As to the relative gain variation 2, as compared to 37.1% in the EDF sample-a, values of less than 30% can be obtained in any cases of the single-body samples-b, -d, and the samples of hybrid structure as well. Therefore, when a gain equalizer cannot be employed because of costs, etc., each hybrid EDF produces the merits of both a high minimum gain value (at 1,524.5 nm) and a small gain variation, as compared to the normal Al-codoped EDF.

Namely, in a state that no filter is included for equalizing gain variation, an optical amplifier in which each hybrid EDF is used as optical amplification medium produces a higher gain at the wavelength of 1,524.5 nm, than the Al-codoped EDFA, and the relative gain variation at the wavelength band of 1,524.5 nm to 1,557.5 nm becomes 35% or less.

Furthermore, in the EDF sample-e, the lowest pumping efficiency is produced. One reason is considered to be an effect of concentration quenching, due to a large mode field diameter and a high Er concentration as shown in FIG. 2.

Figure 19:
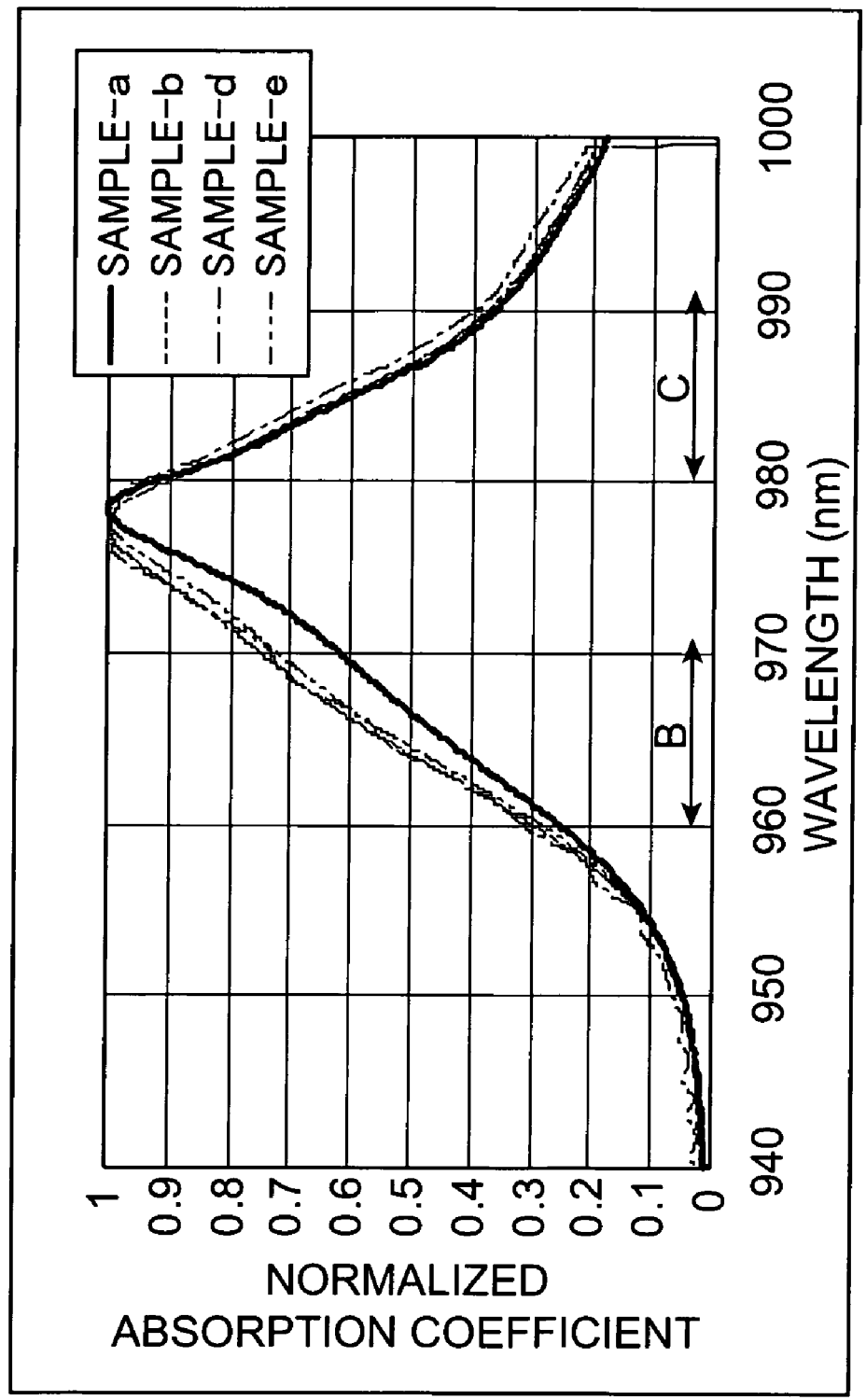
FIG. 19 shows each 0.98-μm band absorption spectrum of the EDF samples-a, -b, -d and -e.
Figure 20:
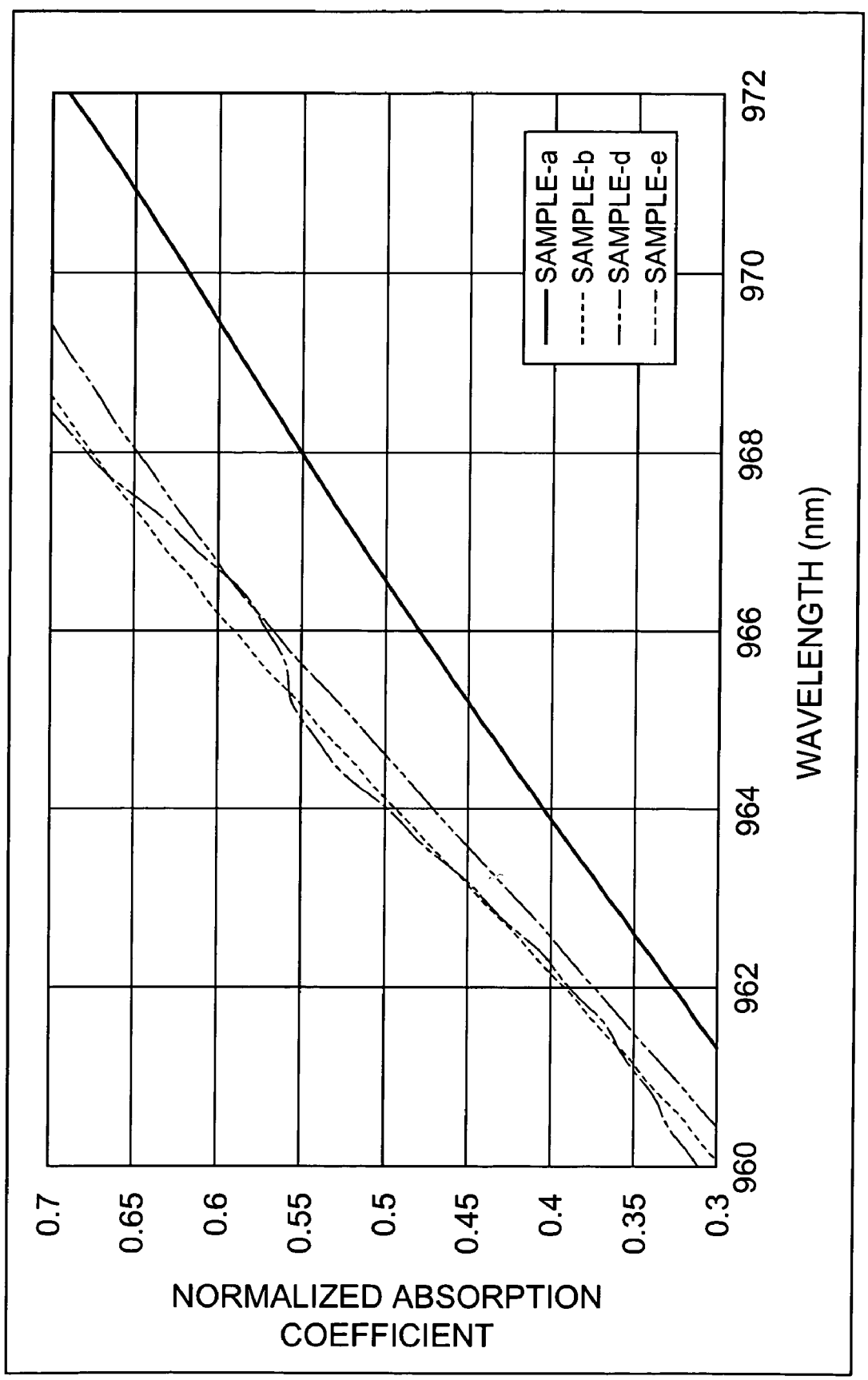
FIG. 20 shows an enlarged diagram of a band area B shown in FIG. 19.
Figure 21:
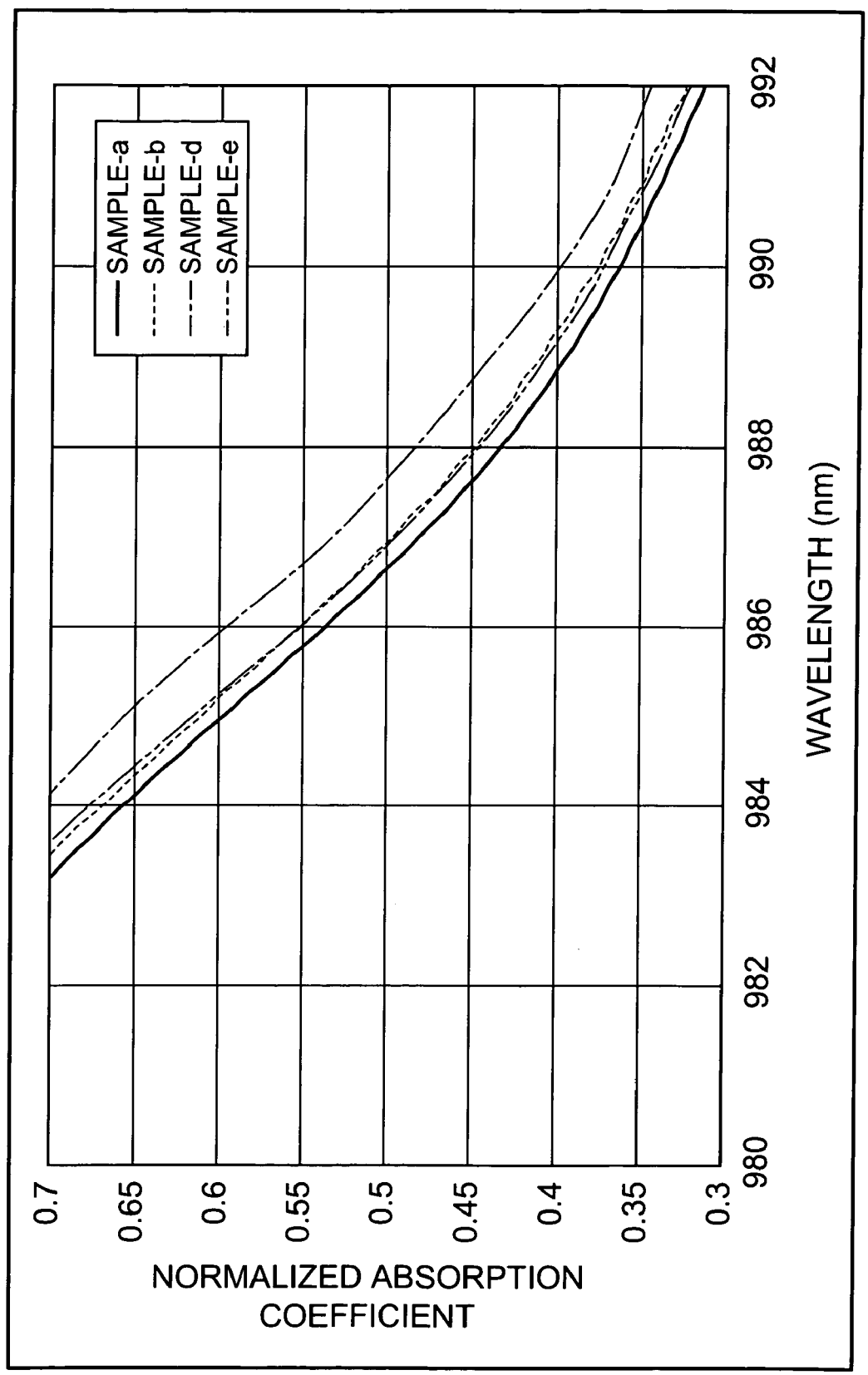
FIG. 21 shows an enlarged diagram of a band area C shown in FIG. 19.

FIG. 19 shows each 0.98-µm band absorption spectrum of the EDF samples-a, -b, -d and -e. In addition, FIG. 20 shows an enlarged diagram of a band area B shown in FIG. 19, and FIG. 21 shows an enlarged diagram of a band area C shown in FIG. 19. The full width at half maximum of the absorption spectra in the respective EDF samples-b, -d and -e, is 22 nm, which is approximately 10% greater than that of the EDF sample-a having the width of 20 nm. Therefore, it is expected that selection of the pumping wavelength become easy when using the respective EDF samples-b, -d and -e as optical amplification media.

However, in the case of the EDF sample-a, the ratio of the peak value of the unsaturated absorption in the 0.98-µm wavelength band, $\alpha_{0.98}$, to the peak value of the unsaturated absorption in the 1.53-µm wavelength band, $\alpha_{1.53}$ (the ratio of $\alpha_{0.98}/\alpha_{1.53}$) is 73%. In contrast, in the cases of the EDF samples-b, -d and -e the ratios are as small as 44%, 49% and 55%, respectively. One reason for the above is the difference in the waveguide structures, as shown in FIG. 2. That is, the cutoff wavelength of the EDF sample-a is the shortest. However, even the above structural difference is taken into consideration, such a large difference in the ratio ($\alpha_{0.98}/\alpha_{1.53}$) may not be explained, and accordingly, the difference in the compositions may well influence the difference in the above ratio.

Figure 22:
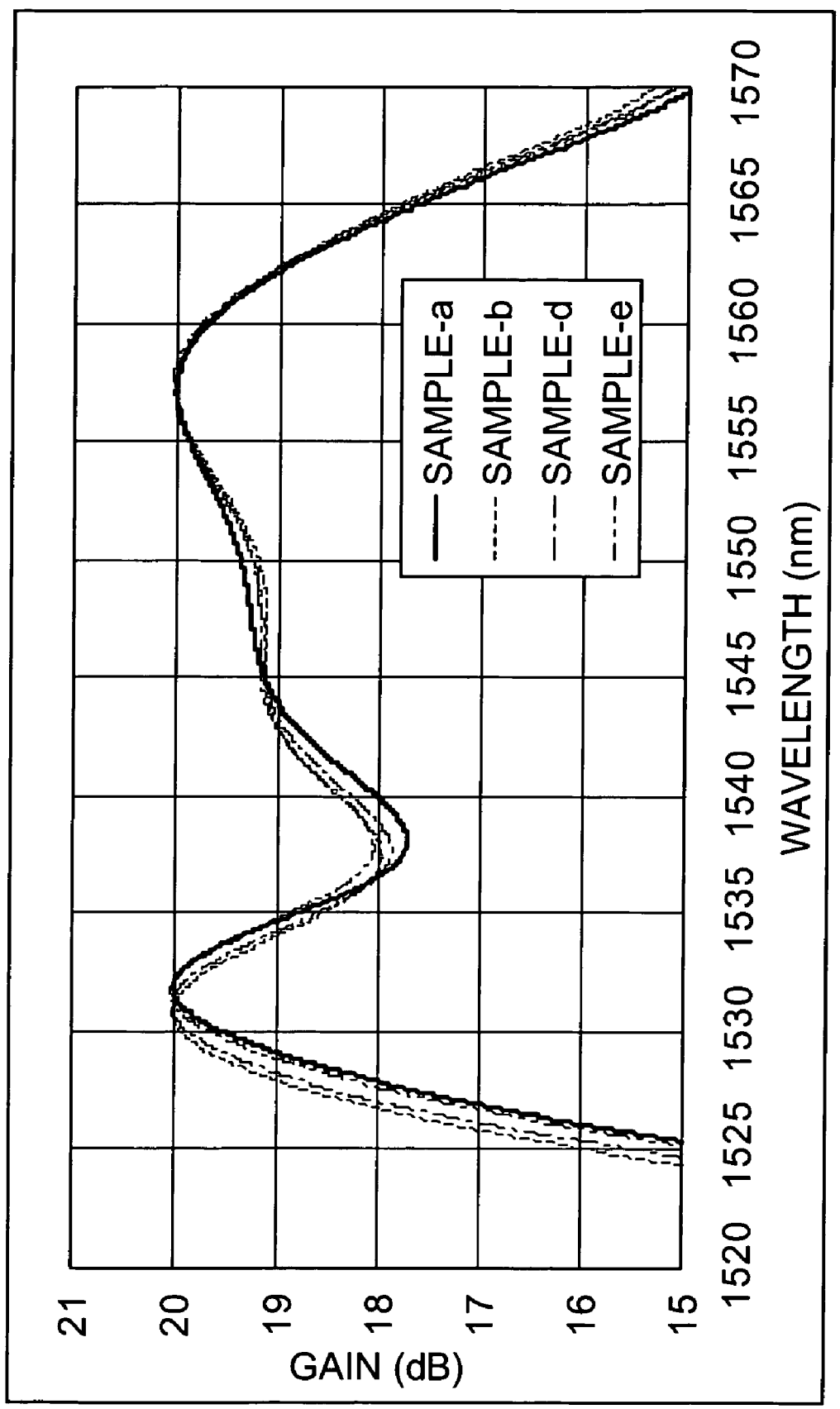
FIG. 22 shows each gain spectrum (which is normalized so as to have the maximum gain value of 20 dB) of the EDF samples-a, -b, -d and -e, to which pumping light of the 1.48-μm wavelength band is irradiated so as to optimize the population inversion of Er (i.e. to make two peaks in the C-band into the same level)

When using pumping at the 1.48-µm wavelength band, which is used as widely as the pumping at the 0.98-µm wavelength band, the above difference ($\alpha_{0.98}/\alpha_{1.53}$) does not cause any problem. Also, as compared to an LD for pumping at the 0.98-µm wavelength band, an LD for pumping at the 1.48-µm wavelength band has a merit of producing higher reliability. FIG. 22 shows each gain spectrum of the EDF samples-a, -b, -d and -e, in which two peaks in the C-band are set to the same level as each other by optimizing the population inversion of Er (pumping Er by means of the pumping light of the 1.48-µm wavelength band), and in a normalized form with a maximum gain value of 20 dB. In FIG. 23, there are shown a relative gain variation 1, which is defined by both the two peak gain values readable from FIG. 22 and the minimum gain value in the wavelength region of 1,530 nm to 1,560 nm in the vicinity of the wavelength of 1,538 nm; a band (effective band) in which the above relative gain variation 1 is satisfied; a relative gain variation per unit effective band obtained from the relative gain variation 1 and the effective band; and a relative gain variation (theoretical variation) when the minimum wavelength in the band is set at 1,524.5 nm.

In any samples, both the relative gain variation 1 and the relative gain variation per unit wavelength band are deteriorated to a certain extent, as compared to the case of the pumping wavelength of 974 nm to 976 nm. In any samples, each effective band takes approximately an intermediate value between the cases of pumping at a wavelength of 974 nm and pumping at a wavelength of 976 nm. As to the theoretical variation, as can be seen from the comparison with FIG. 18, an effect of improvement appears only in the EDF sample-b, even when compared to the EDF sample-a pumped at the wavelength of 976 nm. Therefore, on the whole, the pumping of the 1.48-µm wavelength band is not appropriate for assumed use in CWDM.

Figure 24:
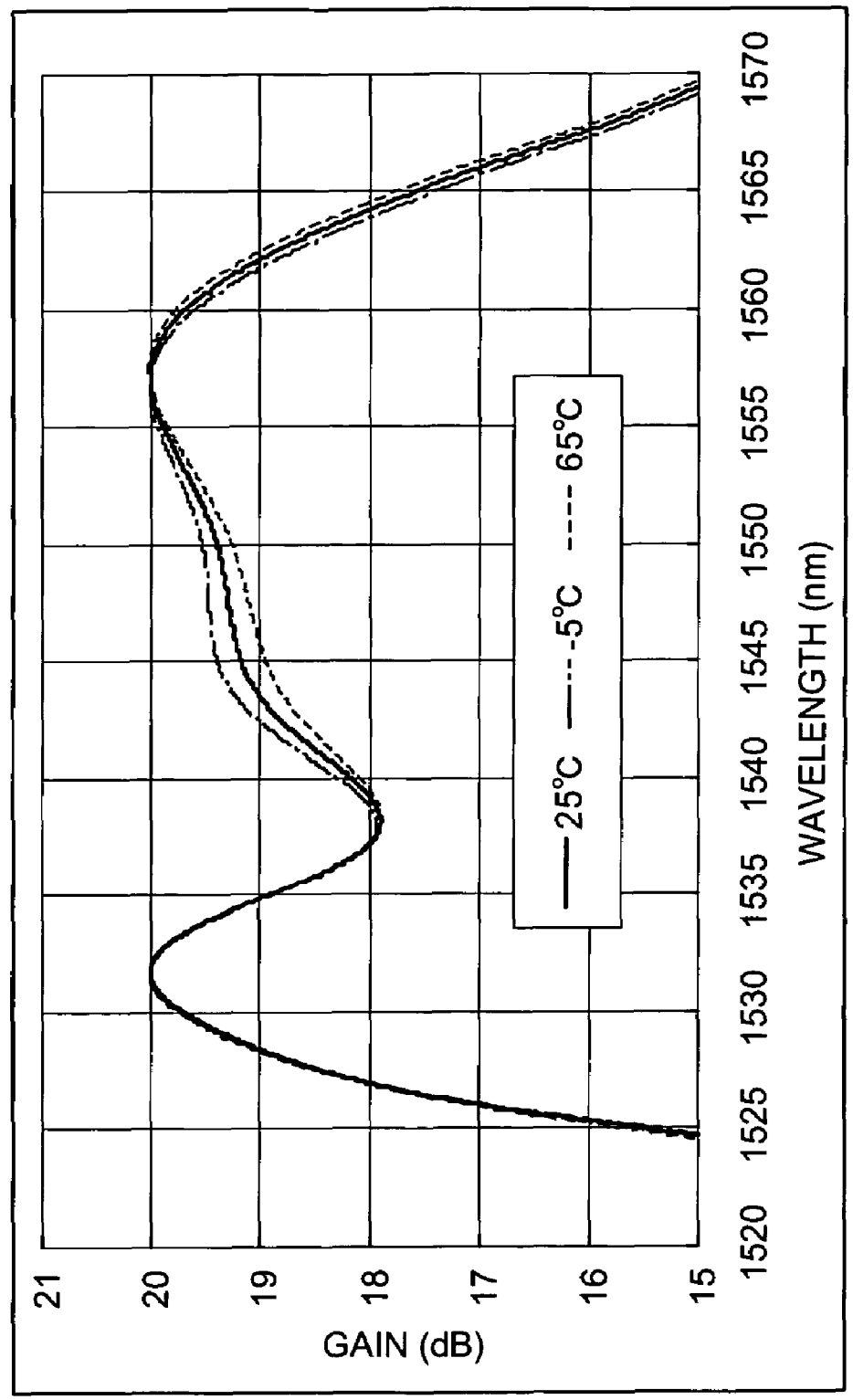
FIG. 24 shows a gain spectrum of the EDF sample-a pumped by the pumping light with a wavelength of 976 nm.
Figure 25:
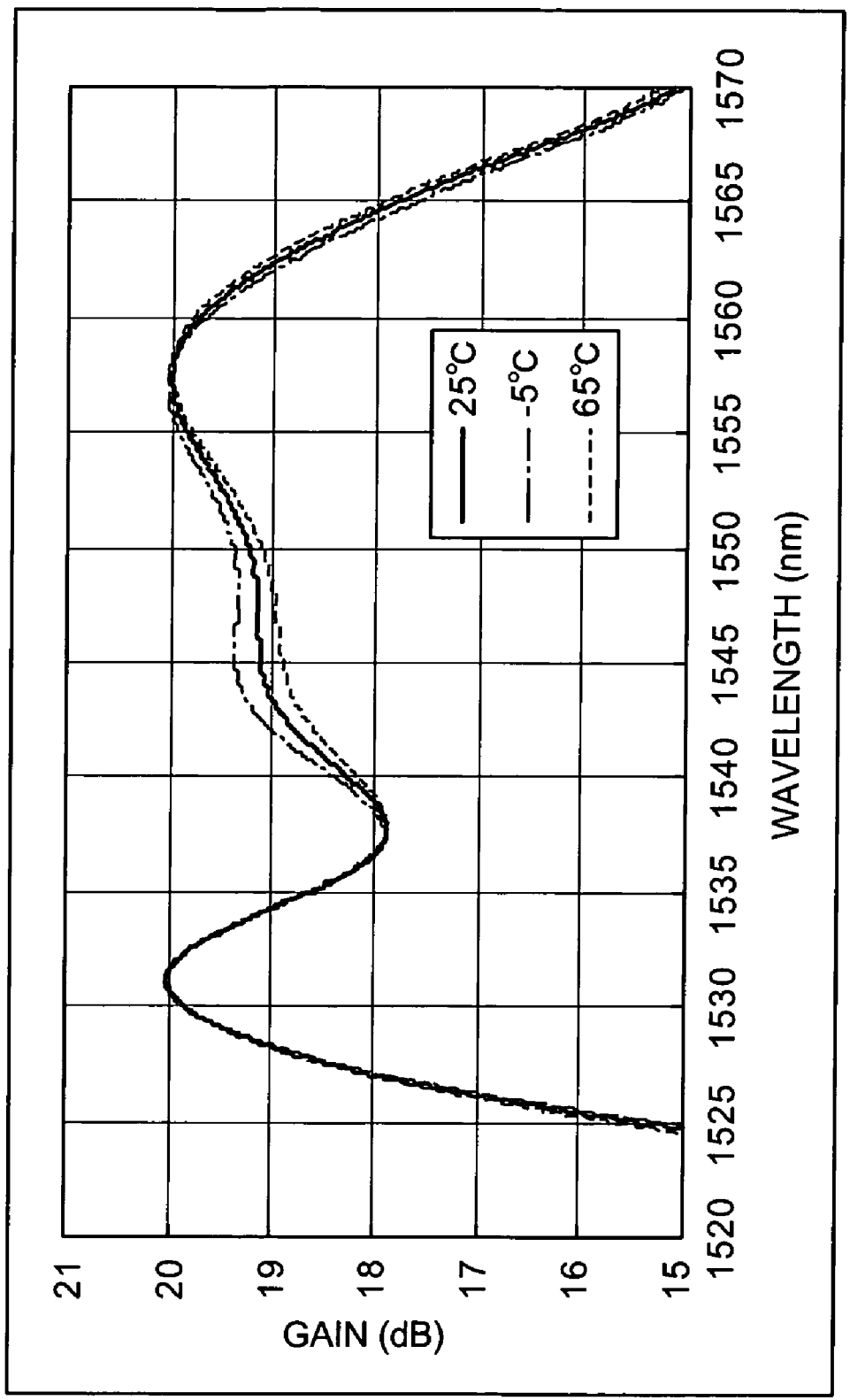
FIG. 25 shows a gain spectrum of the EDF sample-d pumped by the pumping light of the 1.48-μm wavelength band.
Figure 26:
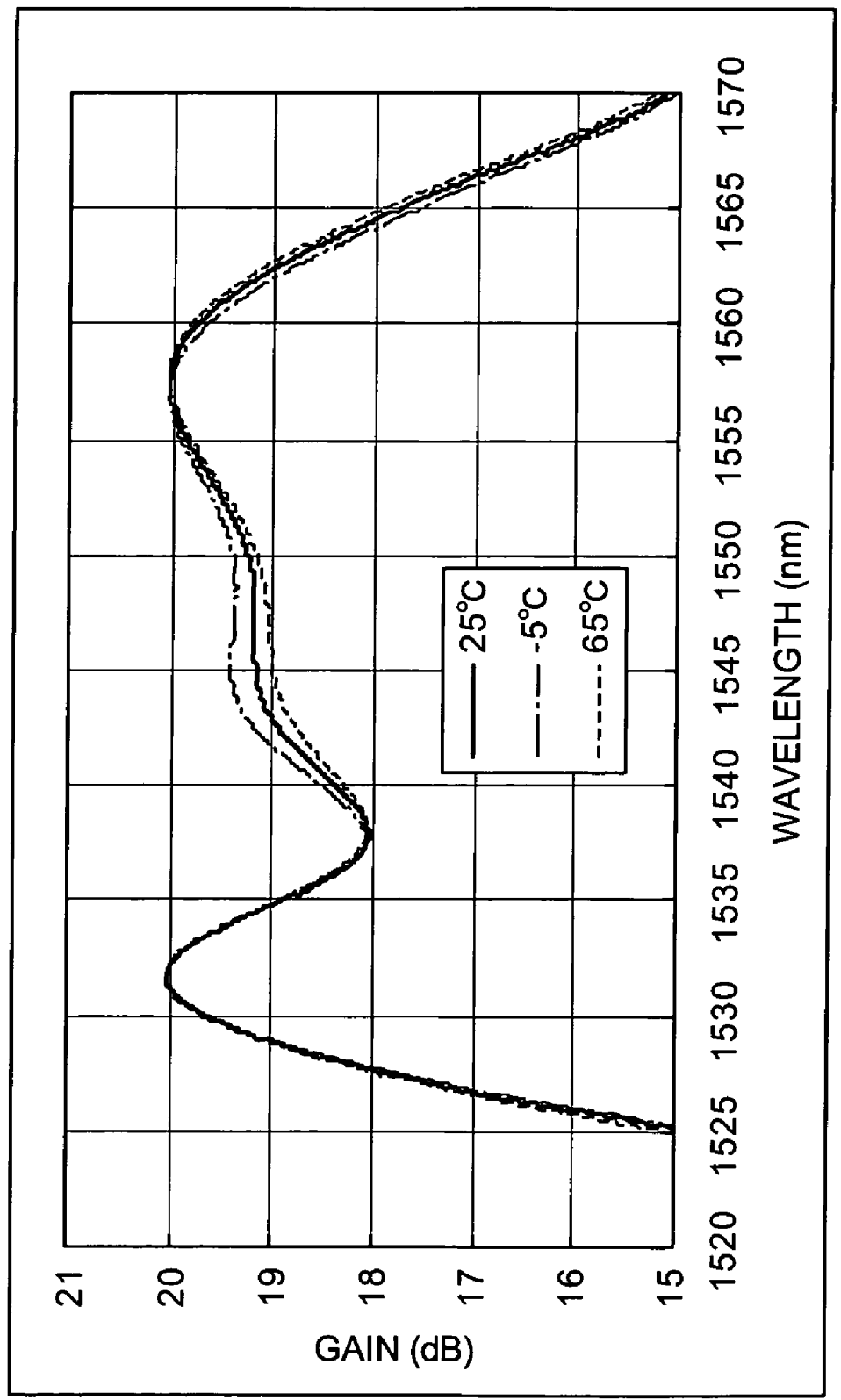
FIG. 26 shows a gain spectrum of the EDF sample-e pumped by the pumping light of the 1.48-μm wavelength band.

Further, although not cited in the aforementioned Documents 1 and 2, it has been known that an environment temperature often affects a gain spectrum shape. The gain spectra having been shown so far are the spectra obtained at room temperature (25° C.), or in that vicinity. However, for an optical amplifier for use in communication equipment, it is required to operate at temperatures approximately ranging from −5° C. to 65° C. FIG. 24 shows a gain spectrum of the EDF sample-a, being pumped by the pumping light with the wavelength of 976 nm. FIG. 25 shows a gain spectrum of the EDF sample-d, being pumped by the pumping light with the wavelength of 1.48-µm wavelength band. Also, FIG. 26 shows a gain spectrum of the EDF sample-e, being pumping by the pumping light with the wavelength of 1.48-µm wavelength band. In the above FIGS. 24 to 26, the gain spectra at the temperatures of −5° C., 25° C. and 65° C. are shown. Similar to the case of the EDF sample-a, fortunately, almost no temperature dependency is found in each of EDF samples-d and -e, also. Additionally, the temperature dependency on the relative gain variation may be almost ignored. On the other hand, as to the effective band, though the wavelength limit on the shorter wavelength side hardly varies, there is a variation of the order of 0.7 nm (namely, for one grid specified by ITU, or of that order) on the longer wavelength side at temperatures ranging from −5° C. to 65° C., which becomes advantageous as temperature increases. Such tendencies are substantially the same when each sample is pumped with other pumping wavelengths.

As having been described, by use of an Er-doped optical gain waveguide, preferably an EDF, it becomes possible to reduce a relative gain variation in the C-band, which is used most universally throughout the world, from 15% shown in the above Document 1 (13.5% maximum in the embodiment shown) to 11% or less, and even 10% or less in maximum. Assuming a case of implementing an optical fiber amplifier having a required gain of 40 dB in an EDF, a peak loss required in a gain equalizer is 6 dB, or 4.4 dB, corresponding to the case when the relative gain variation is 15%, or 11%, thus resulting in a difference of 1.6 dB. In the case of structure that the gain equalizer is provided on the output terminal of the optical fiber amplifier, an increase of signal output power for 1.6 dB extra is necessary. At this time, a pumping laser having a specification capable of outputting higher power by one class or two becomes necessary, which gives a great influence on the cost and power consumption. Further, when a B-codoped EDF such as the samples-b and -d is used, it becomes possible to obtain an effect of extended bandwidth corresponding to one grid (of the order of 0.8 nm) specified by ITU can be obtained, in addition to the effect of improved gain variation.

In accordance with the present invention, it becomes possible to realize excellent gain flatness when performing optical amplification in the C-band, as well as excellent tolerance against the variation of a pumping light wavelength.

From the invention thus described, it will be obvious that the embodiments of the invention may be varied in many ways. Such variations are not to be regarded as a departure from the spirit and scope of the invention, and all such modifications as would be obvious to one skilled in the art are intended for inclusion within the scope of the following claims.

What is claimed is:

1. A method of controlling optical amplification comprising the steps of:
preparing an Al-codoped optical gain waveguide whose optical waveguide region is doped with Er element, said optical waveguide region containing F element or B element together with Er element; and
supplying said optical waveguide region with pumping light having a wavelength of 976 nm or less, or a wavelength of 981 nm or more, which is set so as to have an optimized population inversion of Er in said optical waveguide region such that two peaks in a C-band gain spectrum come to an equivalent level, whereby a gain variation of said Al-codoped optical gain waveguide in the C-band is minimized,
wherein, when the pumping light having the wavelength of 976 nm or less, or the wavelength of 981 nm or more is supplied to said optical waveguide region, a relative gain variation of said Al-codoped optical gain waveguide, defined by a peak gain value and a minimum gain value in a wavelength band of 1,530 nm to 1,560 nm, becomes smaller than 11.5%.

2. A method of controlling optical amplification according to claim 1, wherein a width of a wavelength range in which the relative gain variation becomes smaller than 11.5% is 36 nm or more.

3. A method of controlling optical amplification according to claim 1, wherein, when the pumping light having the wavelength of 976 nm or less, or the wavelength of 981 nm or more is supplied to said optical waveguide region the relative gain variation of said Al-codoped optical gain waveguide becomes smaller than 10%.

4. A method of controlling optical amplification according to claim 3, wherein a width of wavelength range in which the relative gain variation becomes smaller than 10% is 36 nm or more.

5. A method of controlling optical amplification according to claim 1, wherein, when pumping light with a 0.98-µm wavelength band is supplied to said optical waveguide region, a wavelength bandwidth of the pumping light producing the relative gain variation greater than 14% becomes narrower than 3 nm.

6. A method of controlling optical amplification, comprising the steps of:
preparing an Al-codoped optical gain waveguide whose optical waveguide region is doped with Er element, said optical waveguide region containing F element or B element together with Er element; and
supplying said optical waveguide region with pumping light having a wavelength of 976 nm or less, or a wavelength of 981 nm or more, which is selected so as to optimize a population inversion of Er in said optical waveguide region such that two peaks in a C-band gain spectrum come to an equivalent level, whereby a gain variation of said Al-codoped optical gain waveguide in the C-band is minimized,
wherein, when the pumping light having the wavelength of 976 nm or less, or the wavelength of 981 nm or more is supplied to said optical waveguide region, a relative gain variation of said Al-codoped optical gain waveguide, defined by the expression: $100 \times ((\text{peak gain value}) - (\text{gain produced at a wavelength of } 1{,}524.5 \text{ nm})) / (\text{gain produced at the wavelength of } 1{,}524.5 \text{ nm})$, becomes smaller than 35%.

7. A method of controlling optical amplification according to claim 6, wherein, when the pumping light having the wavelength of 976 nm or less, or the wavelength of 981 nm or more is supplied to said optical waveguide region is supplied to said optical waveguide region, the relative gain variation becomes smaller than 30%.

8. A method of controlling optical amplification according to claim 1, wherein said Al-codoped optical gain waveguide has an absorption coefficient spectrum, of which the full width at half maximum is 22 nm or more in the vicinity of a 0.98-μm wavelength band.

9. A method of controlling optical amplification, comprising the steps of:
preparing an Al-codoped optical gain waveguide whose optical waveguide region is doped with Er element, said optical waveguide region containing B element together with Er element; and
supplying said optical waveguide region with pumping light having a wavelength band of 1.48 μm, which is selected so as to optimize a population inversion of Er in said optical waveguide region such that two peaks in a C-band gain spectrum come to equivalent level, whereby a gain variation of said Al-doped optical gain waveguide in the C-band is minimized,
wherein, when the pumping light having the wavelength band of 1.48 μm is supplied to said optical waveguide region, a relative gain variation of said Al-codoped optical gain waveguide, defined by a peak gain value and a minimum gain value in a wavelength band of 1,530 nm to 1,560 nm, becomes smaller than 12%.

10. An optical amplifier comprising:
an Al-codoped optical gain waveguide having, at a wavelength of 1,524.5 nm, a higher gain than an Al-codoped EDFA at a wavelength of 1,524.5 nm not containing both B element and F element when pumping light having the same power is supplied thereto, and also having a relative gain variation of 35% or less in a wavelength band of 1,524.5 nm to 1,557.5 nm when the relative gain variation of said Al-codoped optical gain waveguide is defined by the expression: 100×((peak gain value)−(gain produced at the wavelength of 1,524.5 nm))/(gain produced at the wavelength of 1,524.5 nm); and
a pumping light source supplying pumping light with a specific wavelength into said optical gain waveguide, said optical waveguide region containing B element together with Er element.

11. An optical amplifier comprising:
an Al-codoped optical gain waveguide whose optical waveguide region is doped with Er element, said optical waveguide region containing B element together with Er element; and
a pumping light source supplying pumping light with a predetermined wavelength into said optical waveguide region so that a relative gain variation of said Al-codoped optical gain waveguide per unit bandwidth becomes 0.3%/nm or less throughout a whole signal wavelength region, including 1528 nm, in a gain spectrum of said Al-codoped optical gain waveguide when the relative gain variation of said Al-codoped optical gain waveguide is defined by the expression: 100×((peak gain value as a maximum gain value in the unit bandwidth)−(minimum gain value in the unit bandwidth))/(minimum gain value in the unit bandwidth).

12. An Al-codoped optical gain waveguide whose optical waveguide region is doped with Er element, said optical waveguide region containing F element or B element together with Er element,
wherein pumping light to be supplied to said optical waveguide region has a wavelength of 976 nm or less, or a wavelength of 981 nm or more, which is selected so as to optimize a population inversion of Er in said optical waveguide region such that two peaks in a C-band gain spectrum come to an equivalent level, whereby a gain variation of Al-codoped said optical gain waveguide in the C-band is minimized, and
wherein, when the pumping light having the wavelength of 976 nm or less, or the wavelength of 981 nm or more is supplied to said optical waveguide region, a relative gain variation of said Al-codoped optical gain waveguide, defined by a peak gain value and minimum gain value in the wavelength band of 1,530 nm to 1,560 nm, becomes smaller than 11.5%.

13. An Al-codoped optical gain waveguide according to claim 12, wherein a width of wavelength range in which the relative gain variation becomes smaller than 11.5% is 36 nm or more.

14. An Al-codoped optical gain waveguide according to claim 12, wherein, when the pumping light having the wavelength of 976 nm or less, or the wavelength of 981 nm or more is supplied to said optical waveguide region, the relative gain variation of said Al-codoped optical gain waveguide becomes smaller than 10%.

15. An Al-codoped optical gain waveguide according to claim 14, wherein a width of wavelength range in which the relative gain variation becomes smaller than 10% is 36 nm or more.

16. An Al-codoped optical gain waveguide according to claim 12, wherein pumping light with a 0.98-μm wavelength band is supplied to said optical waveguide region, a wavelength bandwidth of the pumping light producing the relative gain variation greater than 14% becomes narrower than 3 nm.

17. An Al-codoped optical gain waveguide including an optical waveguide region which is doped with Er element, said optical waveguide region containing F element or B element together with Er element,
wherein pumping light to be supplied to said optical waveguide region has a wavelength of 976 nm or less, or a wavelength of 981 nm or more, which is selected so as to optimize a population inversion of Er in said optical waveguide region such that two peaks in a C-band gain spectrum come to an equivalent level, whereby a gain reduction variation of said Al-codoped optical gain waveguide in the C-band is minimized, and
wherein, when the pumping light having the wavelength of 976 nm or less, or the wavelength of 981 nm or more is supplied to said optical waveguide region, a relative gain variation of said Al-codoped optical gain waveguide, defined by the expression: 100×((peak gain value)−(gain produced at a wavelength of 1,524.5 nm))/(gain produced at the wavelength of 1,524.5 nm), becomes smaller than 35%.

18. An Al-codoped optical gain waveguide according to claim 17, wherein, when the pumping light having the wavelength of 976 nm or less, or the wavelength of 981 nm or more is supplied to said optical waveguide region, the relative gain variation becomes smaller than 30%.

19. An Al-codoped optical gain waveguide according to claim 12, wherein said Al-codoped optical gain waveguide has an absorption coefficient spectrum, of which the full width at half maximum is 22 nm or more in the vicinity of a 0.98-μm wavelength band.

20. An Al-codoped optical gain waveguide whose optical waveguide region is doped with Er element, said optical waveguide region containing B element together with Er element,
  wherein pumping light to be supplied to said optical waveguide region has a wavelength band of 1.48 μm, which is selected so as to optimize a population inversion of Er in said optical waveguide region such that two peaks in a C-band gain spectrum come to an equivalent level, whereby a gain variation of said Al-codoped optical gain waveguide in the C-band is minimized, and
  wherein, when the pumping light having the wavelength band of 1.48 μm is, a relative gain variation of said Al-codoped optical gain waveguide, defined by a peak gain value and a minimum gain value in a wavelength band of 1,530 nm to 1,560 nm becomes smaller than 12%.

21. An optical amplifier comprising:
  an Al-codoped optical gain waveguide having, at a wavelength of 1,524.5 nm, a higher gain than an Al-codoped EDFA when pumping light having the same power is supplied thereto, and also having a relative gain variation of 35% or less at a wavelength band of 1,524.5 nm to 1,557.5 nm when the relative gain variation of said Al-codoped optical gain waveguide is defined by the expression: 100×((peak gain value)−(gain produced at the wavelength of 1,524.5 nm))/(gain produced at the wavelength of 1,524.5 nm),
  wherein said Al-codoped optical gain waveguide has an optical waveguide region that is doped with B element, together with Er element.

22. An optical amplifier, comprising:
  an Al-codoped optical gain waveguide whose optical waveguide region is doped with Er element, said optical waveguide region containing B element together with Er element,
  wherein said Al-codoped optical gain waveguide has a gain spectrum in which a relative gain variation of said Al-codoped optical waveguide per unit bandwidth is 0.3%/nm or less, throughout a whole signal wavelength region, including 1528 nm when the relative gain variation of said Al-codoped optical gain waveguide is defined by the expression: 100×((peak gain value as a maximum gain value in the unit bandwidth)−(minimum gain value in the unit bandwidth))/(minimum gain value in the unit bandwidth).

* * * * *